(12) United States Patent
Kubota et al.

(10) Patent No.: US 8,179,753 B2
(45) Date of Patent: May 15, 2012

(54) POSITIONING CONTROL UNIT AND OPTICAL DISK DRIVE

(75) Inventors: Masashi Kubota, Minato-ku (JP); Hisaya Niizawa, Minato-ku (JP)

(73) Assignee: NEC Corporation, Tokyo (JP)

( * ) Notice: Subject to any disclaimer, the term of this patent is extended or adjusted under 35 U.S.C. 154(b) by 477 days.

(21) Appl. No.: 12/301,188

(22) PCT Filed: May 17, 2007

(86) PCT No.: PCT/JP2007/060095
§ 371 (c)(1),
(2), (4) Date: Nov. 17, 2008

(87) PCT Pub. No.: WO2007/132911
PCT Pub. Date: Nov. 22, 2007

(65) Prior Publication Data
US 2009/0252009 A1    Oct. 8, 2009

(30) Foreign Application Priority Data
May 17, 2006    (JP) ................................ 2006-138032

(51) Int. Cl.
*G11B 7/00* (2006.01)
(52) U.S. Cl. ............... 369/44.32; 369/44.29; 369/44.28; 369/126; 369/53.3

(58) Field of Classification Search .................. None
See application file for complete search history.

(56) References Cited

U.S. PATENT DOCUMENTS

| 4,300,226 A * | 11/1981 | Barnette et al. ................. 369/43 |
| 4,744,069 A * | 5/1988 | Sugiyama et al. ......... 369/44.29 |
| 5,144,581 A * | 9/1992 | Toda et al. .................... 369/126 |
| 2004/0240339 A1* | 12/2004 | Kubota et al. .............. 369/44.34 |

FOREIGN PATENT DOCUMENTS

| JP | 62-287484 A | 12/1987 |
| JP | 6-267093 A | 9/1994 |
| JP | 10-021571 A | 1/1998 |
| JP | 2001-291255 A | 10/2001 |

\* cited by examiner

*Primary Examiner* — Van Chow
(74) *Attorney, Agent, or Firm* — Sughrue Mion, PLLC

(57) ABSTRACT

A position-error-signal calculation circuit (105) calculates a relative position error between a laser-focused-beam spot (103) and an information recording layer (102), and generates a focus error signal (106). A filter (108) amplifies and passes therethrough a signal component in the vicinity of the natural resonance frequency of at least one mode among the natural vibration modes of the optical disc medium (101). A drive amplifier receives through a stabilizing compensator (109) and a D/A converter (110) the focus error signal (106) passed by the filter (108), to drive an objective lens (113), thereby allowing the laser-focused-beam spot (103) to track the information recording layer (102).

11 Claims, 17 Drawing Sheets

| (a,b) MODE | b=1 | b=2 |
|---|---|---|
| a=0 | 123Hz | 755Hz |
| a=1 | 117Hz | 819Hz |
| a=2 | 109Hz | 965Hz |
| a=3 | 266Hz | 1.23kHz |
| a=4 | 456Hz | 1.61kHz |
| a=5 | 702Hz | . |
| a=6 | 996Hz | . |
| a=7 | 1.34kHz | . |

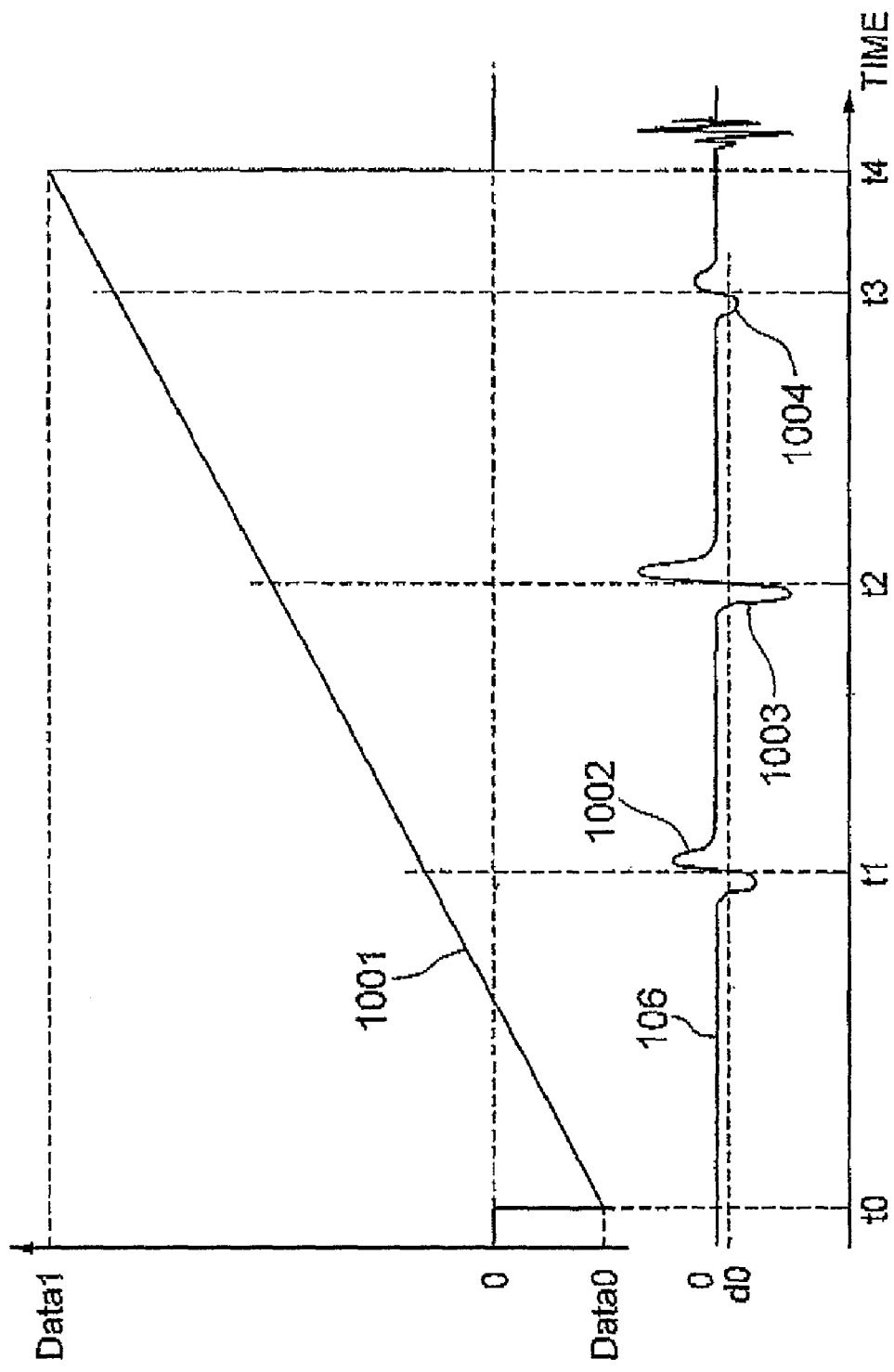

(a)

(b)

POSITIONING CONTROL UNIT AND OPTICAL DISK DRIVE

TECHNICAL FIELD

The present invention relates to a positioning control unit and, more particularly, to a positioning control unit that allows a moving member to track a target position of a target member. The present invention also relates to an optical disc drive and, more particularly, to an optical disc drive including a control mechanism that allows a laser-focused-beam spot to track a target position of an information recording layer or an information recording track of an optical disc medium.

BACKGROUND ART

Optical disc drives have been widely used which irradiate a laser beam onto a disc-shaped information medium configured as an optical disc medium to record/reproduce information thereon. In the optical disc drive, a axial-tracking control that performs high-accuracy focus control on the optical disc medium while responding to the surface fluctuation of the optical disc medium is conducted, as well as a radial-tracking control that performs high-accuracy tracking control of a laser-focused-beam spot with respect to the information recording track on which information is recorded and reproduced. In recent years, a higher density recording of the information and a higher speed (twofold or higher-fold speed) recording/reproduction of the information have been developed, which fact requires a further higher accuracy in those positioning controls. This is because the higher density recording of the information is accompanied by a shorter wavelength of the laser light source and a narrower information recording track on which the information is recorded and reproduced, and achievement of stable recording/reproduction of the high-density information requires higher-accuracy tracking control of the laser-focused-beam spot. For example, the axial-tracking accuracy and radial-tracking accuracy required by the physical standard of a HD DVD (High-Density DVD) using a blue-violet laser as the laser light source are as low as 80 nm or less and 14 nm or less, respectively. Since the higher-fold speed drive in the optical disc drive is achieved by raising the rotational frequency of the optical disc medium, it is necessary to provide a positioning control unit having a higher tracking performance corresponding to the increase in the fluctuation of acceleration of the optical disc medium itself to be tracked for the positioning. The present inventor has conducted analysis of such a positioning control unit, as will be described hereinafter.

In general, it is possible to improve the above tracking accuracy and performance by raising the loop gain of the positioning control system and raising the response frequency band of the control loop. However, there is a limit on the characteristic of the drive machinery system that drives the moving member, and there is a problem in that a sufficient accuracy or performance cannot be secured in many cases. As the technique of solving such a problem, a technique may be considered that reduces an error by using the regularity of surface fluctuation of the disc-shaped information medium or positional fluctuation of the recording track. More specifically, since the up-and-down movement of the disc surface or positional fluctuation of the disc track of the optical disc medium is incurred by the rotation of the optical disc medium, it may be assumed that those components are mainly in synchrony with the rotation of the optical disc medium. Thus, taking advantage of the periodicity of position fluctuation of the information recording position (target position) of the optical disc medium (target member), the tracking performance of the moving member (laser-focused-beam spot) with respect to the target member can be improved by using the position error signal obtained prior to a single rotation or several rotations.

Conventional technologies that use the technique of reducing the error by taking advantage of the fluctuation regularity are described in JP-1985-57085B1 (Patent Publication-1) and W-2002-237154A1 (Patent Publication-2), for example. These conventional technologies use a signal delaying device that accumulates and stores the position error signal with respect to the position fluctuation having a constant period, input the instantaneous position error signal to the signal delaying device after adding the same to the output of the signal delaying device, and input the poison error signal to the drive unit of the moving member after adding the same to the output of the signal delaying device. In this way, these conventional technologies improve the tracking performance of the moving member with respect to the up-and-down movement of the disc surface or the position fluctuation of the disc track, which is in synchrony with the rotation of the disc-shaped information medium.

Here, the up-and-down movement of the disc surface and positional fluctuation of the disc track mainly include not only the components that are in synchrony with the disc rotation, but also components that are out of synchrony with the disc rotation, and these asynchronous fluctuations are also a factor of degrading the tracking accuracy and performance of the positioning control system. The up-and-down movement of the disc surface and positional fluctuation that are asynchronous with the disc rotation include a fluctuation that originates from the natural vibration of the target member that is generated due to excitation of the natural vibration mode by an external disturbance that acts particularly to the optical disc medium. Although the conventional techniques described in the above Patent Publication-1 and Patent Publication-2 are effective to the positional fluctuation that is synchronous with the rotation of the disc-shaped information medium, it is difficult to improve the tracking performance of the moving member with respect to the components of the positional fluctuation that is asynchronous with the rotation of the disc-shaped information medium by using the conventional techniques of Patent Publication-1 and Patent Publication-2, which rather degrade the tracking performance on the contrary and raise a problem.

SUMMARY OF THE INVENTION

It is an object of the present invention to solve the above problems incurred by the conventional techniques and provide a positioning control unit that is capable of allowing the moving member to track the target position of the target member with a higher accuracy even if the target disc-shaped member is involved with the natural vibration to increase the fluctuation of the target position of the positioning due to an external disturbance etc.

It is another object of the present invention to provide an optical disc drive that is capable of allowing the laser-focused-beam spot to track the target position of the information recording layer or information recording track of an optical disc medium with a higher accuracy, even if the target position of the positioning fluctuates due to the natural vibration occurring in the optical disc medium.

The positioning control unit of the first aspect of the present invention is directed to a positioning control unit for allowing a moving member that is a positioning object to track a target position of a disc-shaped target member, including: a position error detector that detects a relative position error between the target position and the moving member, to output the same as a position error signal; a filter that passes therethrough the position error signal, and amplifies and outputs a signal component in a vicinity of a natural resonance frequency of at least one mode selected from natural vibration modes of the target member; and a drive unit that drives the moving member based on an output of the filter.

The positioning control unit of the second aspect of the present invention is directed to a positioning control unit for allowing a moving member that is a positioning object to track a target position of a disc-shaped target member, including: a position error detector that detects a relative position error between the target position and the moving member, to output the same as a position error signal; a frequency estimator that estimates and outputs a natural resonance frequency of at least one mode selected from natural vibration modes of the target member; a filter that passes therethrough the position error signal, and amplifies and outputs a signal component in a vicinity of the natural resonance frequency output from the frequency estimator; and a drive unit that drives the moving member based on an output of the filter.

The optical disc drive of the present invention is directed to an optical disc drive that irradiates a focused-beam spot onto an optical disc medium for recording/reproducing information thereon, including: position error detector that detects a relative position error between an information recording layer or an information recording track of the optical disc medium and the focused-beam spot, to output the same as a position error signal; a frequency estimator that estimates and outputs a natural resonance frequency of at least one mode selected from natural vibration modes of the target member; a filter that passes therethrough the position error signal, and amplifies and outputs a signal component in a vicinity of the natural resonance frequency output from the frequency estimator; and a drive unit that drives the focused-beam spot based on an output of the filter.

The above and other objects, features and advantages of the present invention will be more apparent from the tracking description, referring to the accompanying drawings.

BRIEF DESCRIPTION OF THE DRAWINGS

FIG. 14 is a waveform diagram showing the operating waveform of each part upon measuring the thickness.

DETAILED DESCRIPTION OF EMBODIMENTS OF THE INVENTION

Figure 1:
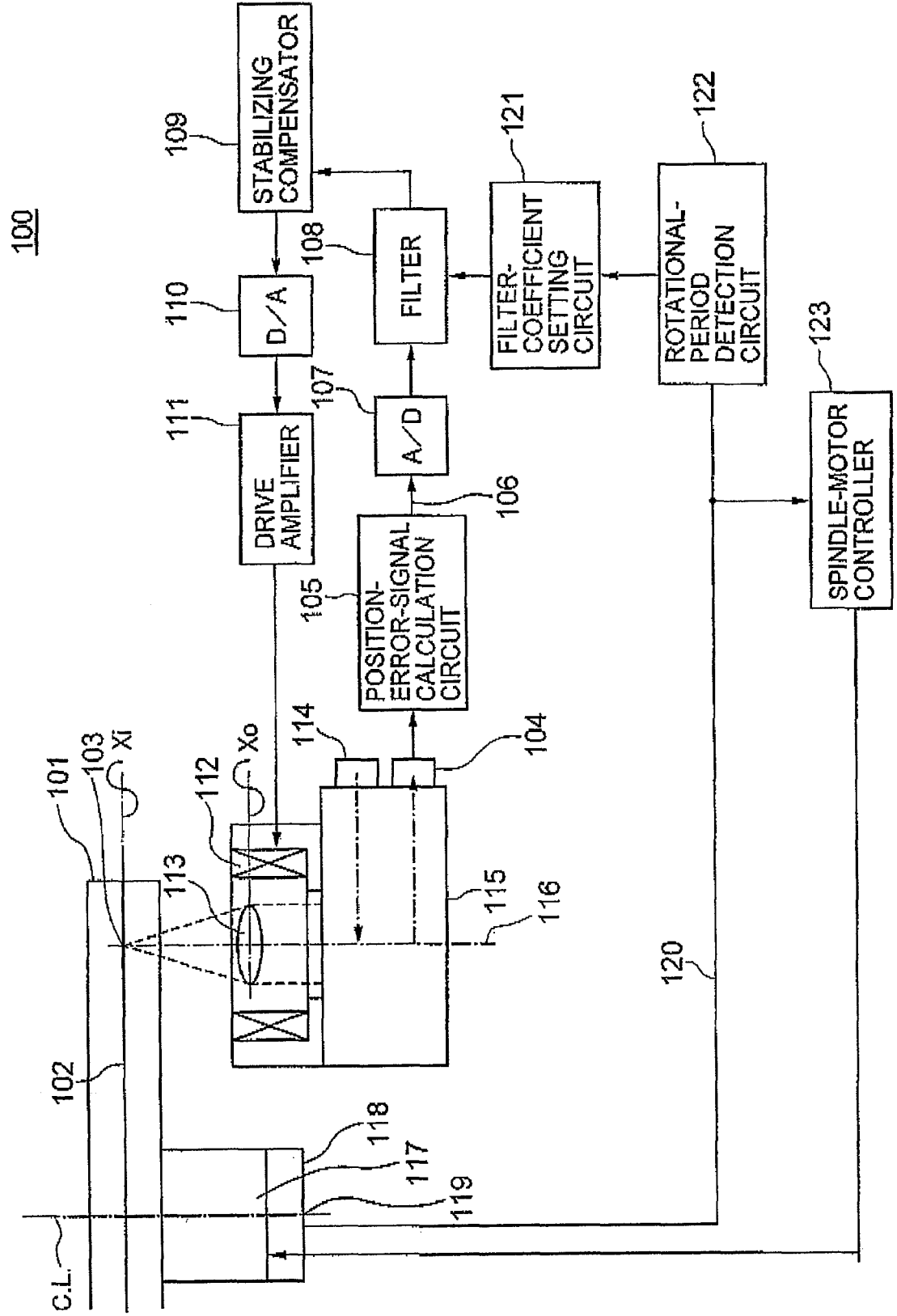
FIG. 1 is a block diagram showing part of an optical disc drive including a positioning control unit according to a first embodiment of the present invention.

Exemplary embodiments of the present invention will be described in detail hereinafter with reference to the drawings. FIG. 1 shows part of the configuration of an optical disc drive including a positioning control unit according to a first embodiment of the present invention. In the same drawing, the basic configuration of the axial-tracking control unit portion of the optical disc drive is extracted for illustration. The optical disc drive 100 includes a position-error-signal calculation circuit 105, an A/D converter 107, a filter 108, a stabilizing compensator 109, a D/A converter 110, a drive amplifier 111, an optical head 115, a spindle motor 117, a filter-coefficient setting circuit 121, a rotational-period detection circuit 122, and a spindle-motor controller 123. The optical head 115 includes a photodetector 104, a focus actuator 112, an objective lens 113, and a laser light source 114.

The photodetector 104, position-error-signal calculation circuit 105 and A/D converter 107 configure a position error detector that detects a relative position error (Xe=Xi−Xo) between the positioning target position Xi of the optical disc medium 101 which configures the target member, and the position Xo of a laser-focused-beam spot (focused position of the laser beam) 103 which configures a moving member. The stabilizing compensator 109, D/A converter 110, drive amplifier 111 and focus actuator 112 configure a drive unit that moves the position of the laser-focused-beam spot 103. In the optical disc drive 100, this drive unit, the position error detector and filter 108 configure a positioning control system that allows the position of the laser-focused-beam spot 103 to track the information recording layer 102, which is the positioning target position of the optical disc medium 101.

The optical disc medium 101 is an optical disc medium including a single layer on one side thereof and, for example, compliant with the HD DVD standard, has a shape of circular plate having a nominal diameter of 120 mm and a nominal thickness of 1.2 mm, and has the structure obtained by bonding together two substrates made of 0.6-mm-thick polycarbonate. The information recording layer 102 of the optical disc medium includes a protective film, a phase-change recording film and a reflection film which are layered one on another, so long as the optical disc medium is for a recording use. If the optical disc medium is for a read-only use, a reflection film and a protective film are layered onto the information pits formed on the substrate. The position of the phase-change recording film of the information recording layer 102 and position of the information pits are the positioning target positions. The positioning target position fluctuates in the location thereof in the optical axis direction 116 due to the surface fluctuation or natural vibration of the optical disc medium 101.

The laser beam emitted from the laser light source 114 is focused by the objective lens 113 and irradiated onto the optical disc medium 101. For example, a blue-violet semiconductor laser device having a wavelength of 405 nm is used for the laser light source 114. NA (numerical aperture) of the objective lens 113 is set at 0.65. The laser-focused-beam spot 103 is displaced by driving the objective lens 113 in the optical-axis direction 116 of the laser beam by using the focus actuator 112. The light signal returned from the optical disc medium 101 is passed by the objective lens 113 and converted into an electric signal in the photodetector 104, and is input to the position-error-signal calculation circuit 105.

The position-error-signal calculation circuit 105 extracts, from an output signal of the photodetector 104, a focus error signal 106 representing the relative position error between the laser-focused-beam spot 103 and the information recording layer 102 in the optical-axis direction 116, and outputs the same. In general, a knife-edge method, an astigmatic method etc. are used for detection of the focus error signal 106. The photodetector 104 outputs the signal corresponding to detection of the focus error signal by the knife-edge method, for example. The focus error signal 106 output from the position-error-signal calculation circuit 105 is equivalent to the relative position error Xe between position Xo of the laser-focused-beam spot 103 and position Xi of the information recording layer 102. The focus error signal 106 is output to the filter 108 after converting the same into a digital signal by using the A/D converter 107.

The filter 108 receives the focus error signal 106 converted into the digital signal by the A/D converter 107, and outputs the same to the stabilizing compensator 109. The filter 108 amplifies and outputs a component of the focus error signal 106 in the vicinity of the natural resonance frequency of at least one natural vibration mode selected from the natural vibration modes that the optical disc medium 101 has. The filter coefficients of the filter 108 are controlled by the filter-coefficient setting circuit 121 described later. The stabilizing compensator 109 performs a gain adjustment processing and a phase compensation processing to the output of the filter 108. The output signal of the stabilizing compensator 109 is delivered to the drive amplifier 111 after converting the same into an analog signal by using the D/A converter 110. The drive amplifier 111 performs power amplification of the output signal of the D/A converter 110, and outputs the same to drive the focus actuator 112 in the optical-axis direction 116.

The optical disc medium 101 is clamped onto the spindle motor 117. The spindle motor 117 rotates the optical disc medium 101 with respect to the rotational axis 119 of the spindle motor at a predetermined rotational speed (period) in a predetermined rotational direction. A hole sensor 118 attached onto the spindle motor 117 outputs a rotational-angle pulse signal (FG signal) 120 corresponding to the rotational angle of the spindle motor 117, in other words, corresponding to the rotational angle of the optical disc medium 101. The hole sensor 118 outputs a 18-cycle pulse signal, for example, per rotation of the spindle motor 117 as the FG signal 120. The spindle-motor controller 123 performs rotation control of the spindle motor 117 so that the period of this FG signal 120 assumes a predetermined period.

A rotation-period detection circuit 122 receives the FG signal 120, calculates the time interval for every 18 cycles of the #G signal 120 by using the clock signal and a counter circuit not illustrated, acquires the information on the rotational speed of the optical disc medium 101, and outputs the same to the filter-coefficient setting circuit 121. It is to be noted that the rotational-period detection circuit 122 outputs "rotational speed=0" to the filter-coefficient setting circuit 121 in the initial state, such as immediately after turn-ON of the power source to the optical disc drive 100. The filter-coefficient setting circuit 121 estimates the natural resonance frequency of the optical disc medium 101 based on the rotational-speed information output from the rotational-period detection circuit 122, and outputs the same to the filter 108, thereby setting the coefficient of the filter 108. The filter-coefficient setting circuit 121 changes the coefficients of the filter 108 based on the changed rotational-speed information each time the rotational-speed information is changed.

The principle of the control in the present embodiment will be described hereinafter. First, the natural vibration mode of an optical disc medium will be described with reference to FIG. 2. In the description to follow, a case using an optical disc medium which is compliant with the physical standard of HD DVD, DVD (digital versatile disk) or CD (compact disc) will be exemplified. The optical disc medium compliant with this physical standard is of an annular-disc shape having a nominal diameter of 120 mm, a nominal inside diameter of 15 mm, and a nominal thickness of 1.2 mm, and includes polycarbonate as the main component thereof.

Figure 2:
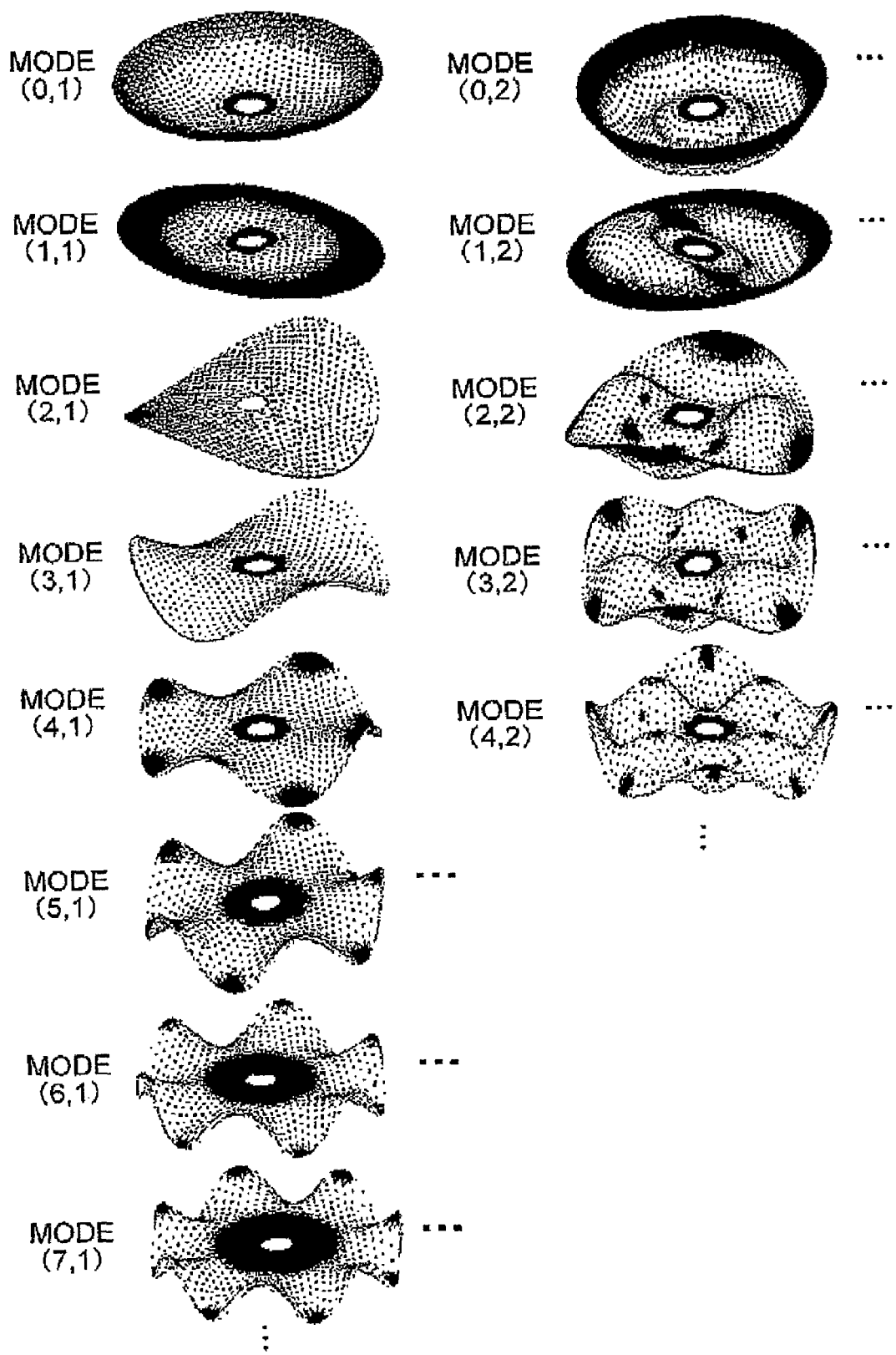
FIG. 2 is schematic diagram showing a variety of natural vibration modes in an optical disc medium.

The optical disc medium has the natural vibration modes shown in FIG. 2, so long as part of the vibration modes not higher than hepta-order mode is exemplified. The natural vibration modes of the optical disc medium shown in this figure are excited by application of an external vibration or impact onto the optical disc drive even when the optical disc medium is not rotated. When the optical disc medium is rotated, in particular, at a high speed, the natural vibration modes are conspicuously excited by an unbalanced force occurring due to deviation of the center of gravity of the optical disc medium itself or oscillation of the rotational axis of the spindle motor, the friction force occurring between the optical disc medium and the ambient air etc, and accordingly, the tracking performance of the laser-focused-beam spot is degraded by the excited natural vibration of the optical disc medium.

Figures 3, 4:
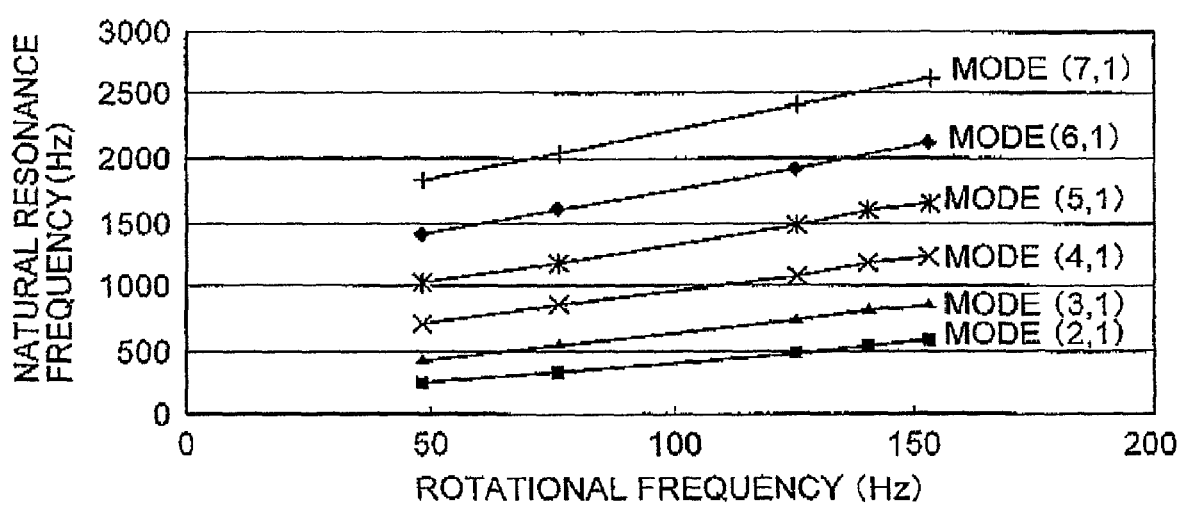
FIG. 3 is a table showing the resonance frequency of each natural vibration mode shown in FIG. 2.
FIG. 4 is a graph showing the relationship between the rotational frequency of an optical disc medium and the natural resonance frequency of each natural vibration mode of the optical disc medium.

The vibration frequencies of the respective natural vibration modes shown in FIG. 2 are collectively shown in FIG. 3. It is to be noted that FIG. 3 shows the respective natural resonance frequencies when the optical disc medium is not rotated. If there exist only primary natural vibration modes, such as mode (1, 1) and mode (0, 1), in the optical disc medium, it is often possible to handle the positioning control by raising the tracking performance in the lower frequency range, without broadening the control band of the positioning control system, because of the lower natural resonance frequency thereof. On the other hand, in higher-order natural vibration modes, such as mode (2, 1) and mode (3, 1), the natural resonance frequencies are in the vicinity of the control band frequency of the positioning control system, whereby it is difficult to raise the tracking performance without broadening the control band. However, even in such a case, it is possible to improve the tracking performance of the laser-focused-beam spot by raising the tracking performance by the positioning control unit with respect to the frequency component in the vicinity of the natural resonance frequency of each of the natural vibration modes exemplified in FIG. 3, without broadening the control band.

Upon rotating the optical disc medium, there is a problem in that the natural resonance frequency of the optical disc medium is changed as observed from the laser-focused-beam spot. This change of the natural resonance frequency is caused by a change of the relative speed occurring between the laser-focused-beam spot and the optical disc medium as well as a change of the centrifugal force acting on the optical disc medium. FIG. 4 shows the relationship between the rotational frequency and the natural resonance frequency of the optical disc medium. In this figure, change of the natural resonance frequency with respect to the rotational frequency of the optical disc medium is shown for the natural vibration modes from mode (2,1) to mode (7, 1) illustrated in FIG. 2.

Generally, the rotational frequency of the optical disc medium is changed depending on the operating state of the optical disc drive. If the optical disc drive is operated using a CLV (constant linear velocity) technique wherein the linear velocity of the information recording position of the optical disc medium is roughly constant, the rotational frequency of the optical disc medium is changed by around twice or a little more in accordance with the change of radial position of the laser-focused-beam spot on the optical disc medium. On the other hand, if the optical disc is operated using a CAV (constant angular velocity) technique wherein the rotational frequency of the optical disc medium is roughly constant, the rotational frequency is constant; however, the setting of multiple speed for recording/reproducing the information is often changed in operation depending on the quality of recording/reproduced information, and in such a case, the rotational frequency of the optical disc medium is changed. It is to be noted that in either case the maximum rotational speed is restricted to around 10000 rpm or a little higher due to the limit of mechanical strength of the optical disc medium.

If the rotational frequency of the optical disc medium is changed, the change of each natural resonance frequency is estimated based on the rotational frequency of the optical disc medium. By raising the tracking performance by the positioning control unit with respect to the frequency component in the vicinity of each estimated natural resonance frequency, the tracking performance of the laser-focused-beam spot can be improved. In the present embodiment, the change of natural resonance frequency, which changes as shown in the graph of FIG. 4, is approximated by a primary function, to estimate the change of natural resonance frequency with respect to the rotational frequency of the optical disc medium.

Figure 5:
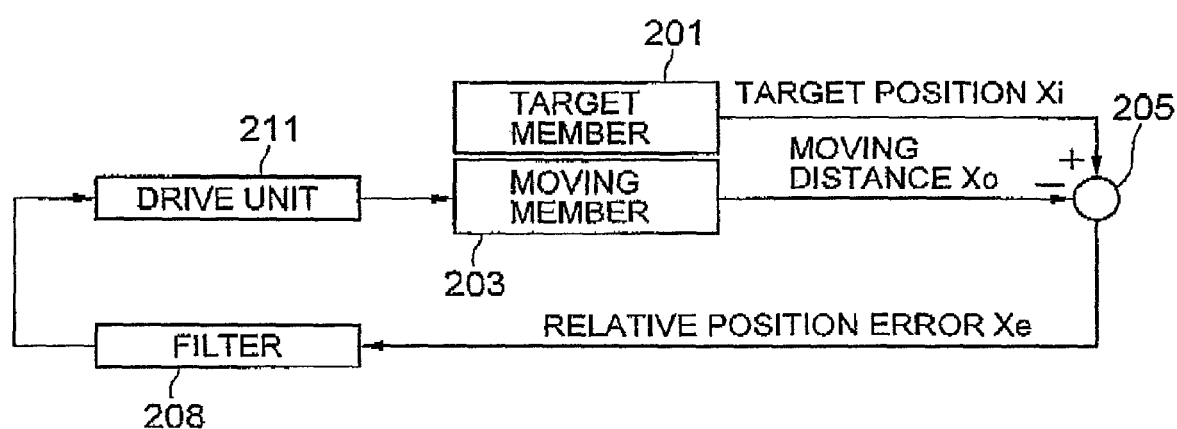
FIG. 5 is a block diagram showing a positioning control system.

Hereinafter, the principle of the positioning control used in the present embodiment will be described. FIG. 5 shows a block diagram of the positioning control. In this figure, Xi represents the positioning target position of a target member 201 corresponding to the optical disc medium 101 in FIG. 1, Xo represents displacement (moving distance) of a moving member 203 corresponding to the laser-focused-beam spot 103 in FIG. 1, and these values are input to the subtractor 205. The relative position error between both the values output from the subtractor 205 is expressed by Xe=Xi−Xo. In FIG. 5, for simplification of description, transfer characteristic of the system from the moving distance Xo of the moving member to the position error signal Xe is normalized by 1.

A drive unit 211 corresponds to the stabilizing compensator 109, D/A converter 110, drive amplifier 111, and focus actuator 112 in FIG. 1, and drives the moving member 203. A filter 208 corresponds to the filter 108 in FIG. 17, and the transfer function of the filter 208 is expressed by F(s) with the "s" being a Laplace operator. The transfer function F(s) of the filter 208 is defined by:

$$F(s)=\Pi_{[a=0,\infty;b=0,\infty]}(s^2+2\zeta_{n(a,b)}\omega_{(a,b)}s+\omega_{(a,b)}^2)/(s^2+2\zeta_{d(a,b)}\omega_{(a,b)}s+\omega_{(a,b)}^2) \quad (1),$$

where $\zeta_{n(a,b)} > \zeta_{d(a,b)} \geq 0$, and $\omega_{(a,b)} = 2\pi f_{0(a,b)}$. Here, the symbol $\Pi$ in formula (1) represents a series product, whereas $f_{0(a,b)}$ represents the natural resonance frequency (Hz) of each of the respective natural vibration modes exemplified in FIG. 3.

The formula (1) as shown above is an infinite-series product and thus cannot be realized without modification. However, it is practically unnecessary to improve the tracking performance by the positioning control system with respect to all of the natural vibration modes. That is, a practically sufficient merit can be obtained by experimentally determining in advance the dominant vibration modes, which are disincentive against the tracking performance, and then raising the tracking performance with respect to the respective determined vibration modes. In the present embodiment, it is determined in advance that the mode (2, 1), mode (3, 1) and mode (4, 1) shown in FIG. 2 are the dominant vibration modes, based on comparison between the power spectrum of the relative position error and the power spectrum of the vibration amplitude of the optical disc medium that is measured using a laser Doppler vibration meter, and then it is decided to apply the positioning control to these three natural vibration modes, In this case, the above formula (1) is transformed into the following formula:

$$F(s)=\Pi_{[a=2,4;b=1]}(s^2+2\zeta_{n(a,b)}\omega_{(a,b)}s+\omega_{(a,b)}^2)/(s^2+2\zeta_{d(a,b)}\omega_{(a,b)}s+\omega_{(a,b)}^2) \quad (2)$$

The filter 208 having a transfer function F(s) defined by the above formula (2) can be realized as a filter of a finite order. When the relative position error signal Xe is input to the filter 208 wherein the natural resonance frequency of the numerator polynomial and denominator polynomial in this transfer function F(s) is made equal to the natural resonance frequency of the optical disc medium that is the target member 201 and determined as $\zeta n(a, b) > \zeta d(a, b) > 0$, the filter 208 amplifies and outputs the frequency components in the vicinity of the natural resonance frequencies of the three natural vibration modes of the optical disc medium selected beforehand. Accordingly, by suitably determining the frequency characteristic of the drive unit 211 so that the control system of FIG. 5 including the filter 208 becomes stable, this positioning control mechanism improves the tracking performance of the moving member 203 with respect to the components of position fluctuation of the target member 201 that is asynchronous with the rotation of the disc-shaped information medium.

It should be noted that the filter 208 defined by the above formula (2) is one for improving the tracking performance of positioning control with respect to the natural vibration of the optical disc medium when the optical disc medium is not rotated. For improving the tracking performance by the positioning control with respect to the natural vibration of the optical disc medium when the optical disc medium is rotated, it is sufficient to transform the formula (2) in the manner as shown by the following formulas (3-1) and (3-2). In the formula (3-2), the $f_s$ is the rotational frequency (Hz) of the optical disc medium, the $C_{1(a,b)}$ is the gradient (Hz/Hz) when the change of the natural resonance frequency accompanying the rotational frequency change of the optical disc medium in the graph shown in FIG. 4 is primarily approximated, and the $f\sim_{0(a,b)}$ is a zero-order coefficient (Hz). In the optical disc medium used in the present embodiment, the $f_{0(a,b)}$ and $f\sim_{0(a,b)}$ assumed an approximately equal value.

$$F(s)=\Pi_{[a=2,4;b=1]}(s^2+2\zeta_{n(a,b)}\omega_{(a,b)}s+\omega_{(a,b)}^2)/(s^2+2\zeta_{d(a,b)}\omega_{(a,b)}s+\omega_{(a,b)}^2) \quad (3\text{-}1),$$

where $\zeta_{n(a,b)} > \zeta_{d(a,b)} > 0$; and $$\omega_{(a,b)}=2\pi[C_{1(a,b)}f_s + f\sim_{0(a,b)}] \quad (3\text{-}2)$$

The filter 208 defined by the above formulas (3-1) and (3-2) changes the central frequency thereof based on which the tracking performance by the positioning control is raised depending on the rotational frequency of the optical disc medium. Thus, the tracking performance by the positioning control with respect to the natural vibration of the optical disc medium can be improved by using the filter 208 having such a transfer function F(s), even when the optical disc medium that is the target member 201 is rotated.

Back to FIG. 1, the transfer characteristic P(s) of the system wherein the focus actuator 112 and drive amplifier 111 are connected in series in the optical disc drive 100 of the present embodiment may be approximated by the following formula (4):

$$P(s)=P_1(S)P_2(s)P_3(s)P_e(s);$$

$$P_1(s)=1.07\times10^4/(s^2+80.0s+1.24\times10^5);$$

$$P_2(s)=(0.755s^2+3.19\times10^4s+5.26\times10^{10})/(s^2+1.83\times10^4s+5.26\times10^{10});$$

$$P_3(s)=8.91\times10^{10}/(s^2+1.19\times10^4s+8.91\times10^{10}); \text{ and}$$

$$P_e(s)=1.95\times10^5/(s+1.95\times10^5) \quad (4).$$

Transfer function C(z) of the stabilizing compensator 109 is defined by the following formula (5):

$$C(z)=Z[(5.78\times10^{10}s+5.45\times10^{14})/(s^2+3.36\times10^5s+2.13\times10^{10})] \quad (5)$$

The z in formula (5) represents a forward-shift operator, and the Z[ ] represents Z-transformation with a zero-order hold. The sampling frequency of the Z-transformation is set at $4\times10^5$ Hz.

Transfer function F(s) of the filter 108 is defined by the above formula (3-1). However, since the filter 108 is a digital-signal filter, the above formula (3-1) is used after transforming the same in the following manner:

$$F(z)=Z[F_{2,1)}(s)F_{(3,1)}(s)F_{(4,1)}(s)];$$

$$F_{(a,b)}(s)=(s^2+2\zeta_{n(a,b)}\omega_{(a,b)}s+\omega_{(a,b)}^2)/(s^2+2\zeta_{d(a,b)}\omega_{(a,b)}s+\omega_{(a,b)}^2)$$

where a=2, 3, 4, b=1;

$$\zeta_{n(2,1)}=0.080; \zeta_{d(2,1)}=0.020;$$

$$\zeta_{n(3,1)}=0.064; \zeta_{d(3,1)}=0.020; \text{ and}$$

$$\zeta_{n(4,1)}=0.050; \zeta_{d(4,1)}=0.020 \quad (6\text{-}1).$$

The filter-coefficient setting circuit 121 estimates the $\omega_{(a,b)}$ based on the rotational-speed information ($f_s$) output from the rotational-period detection circuit 122 to deliver the same to the filter 108, by using the following formula (6-2):

$$\omega_{(2,1)}=2\pi[3.03f_s+102];$$

$$\omega_{(3,1)}=2\pi[4.02f_s+252]; \text{ and}$$

$$\omega_{(4,1)}=2\pi[4.99f_s+466] \quad (6\text{-}2).$$

Each coefficient for $\omega_{(a,b)}$ in the above formula (6-2) is obtained by primarily approximating the graph shown in FIG. 4.

Figure 6A:
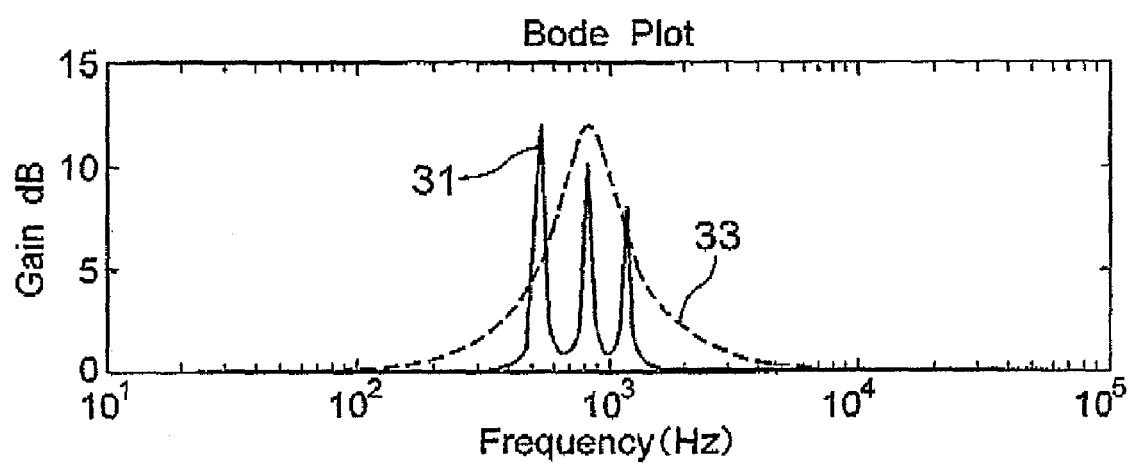
FIGS. 6A and 6B are Bode diagrams each showing the filter characteristic.
Figure 6B:
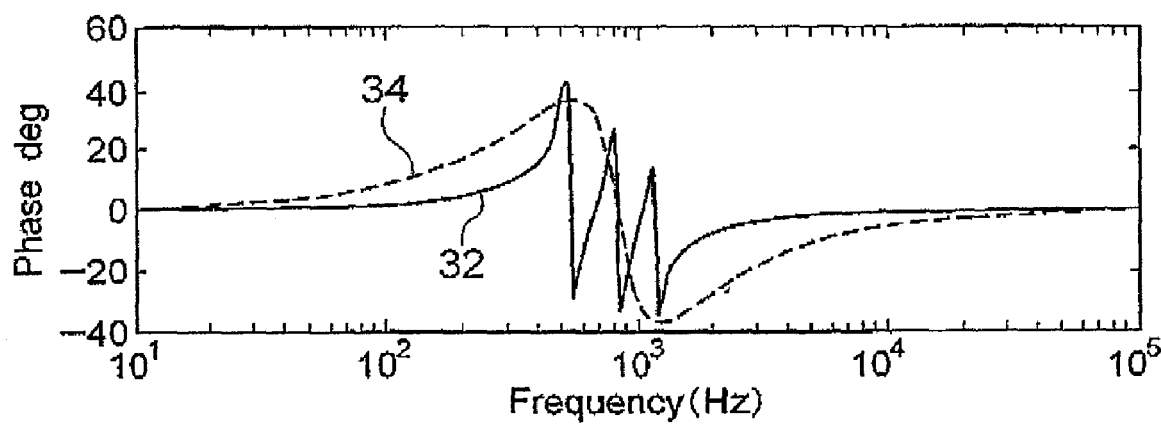

FIGS. 6A and 6B each show a Bode diagram of the filter 108. FIG. 6A shows the relationship between the frequency and the gain, whereas FIG. 6B shows the relationship between the frequency and the phase. The Bode diagrams of the filter 108 for the formula (6-1) where fs=145 Hz are represented by graphs 31, 32 in FIGS. 6A and 6B. With reference to the drawings, use of the filter 108 defined by the formula (6-1) allows the focus error signal 106 input to the filter 108 to be amplified, in the vicinity of the frequency of 541 Hz which is the natural resonance frequency in the (2,1) mode, frequency of 835 Hz which is the natural resonance frequency in the (3,1) mode, and the frequency of 1190 Hz which is the natural resonance frequency in the mode (4, 1).

Figure 7A:
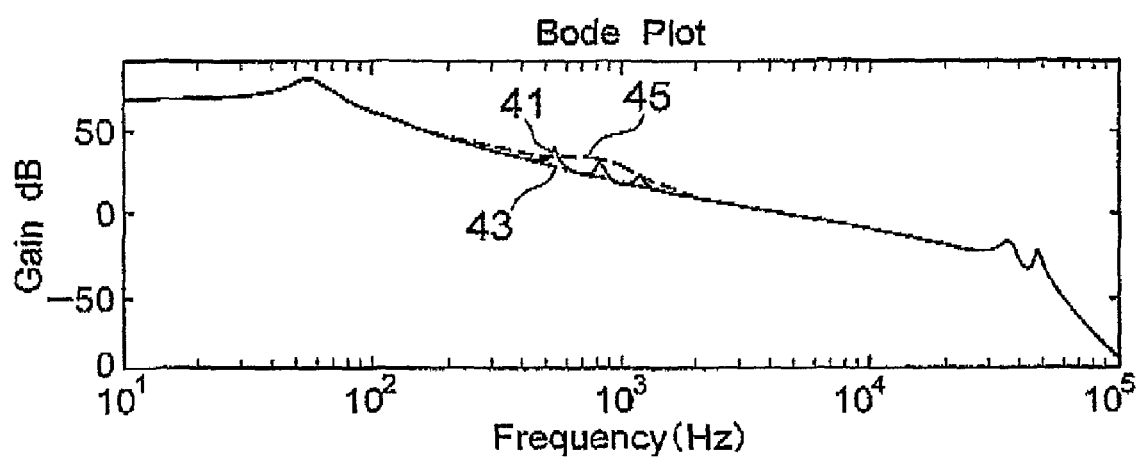
FIGS. 7A and 7B are Bode diagrams each showing the frequency characteristic of a open-loop transfer function in the positioning control system.
Figure 7B:
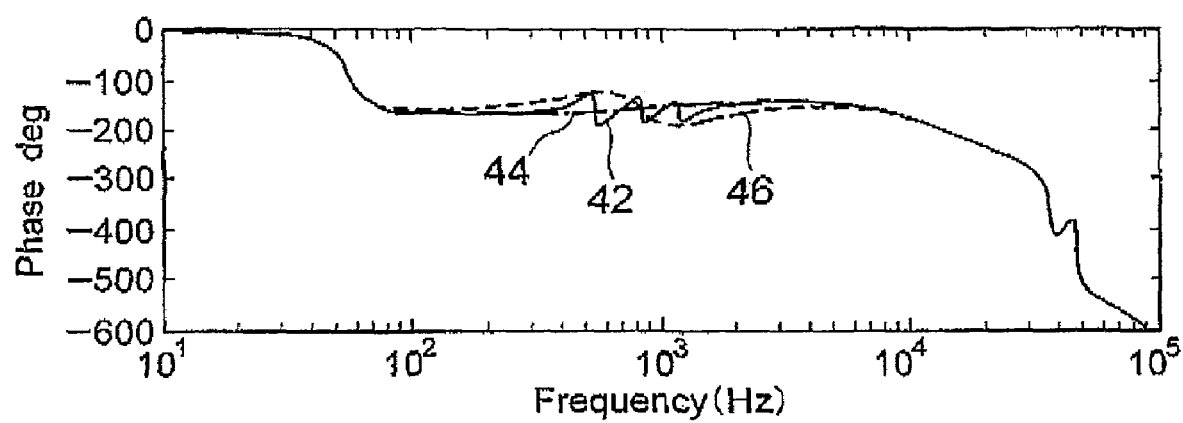
Figure 8A:
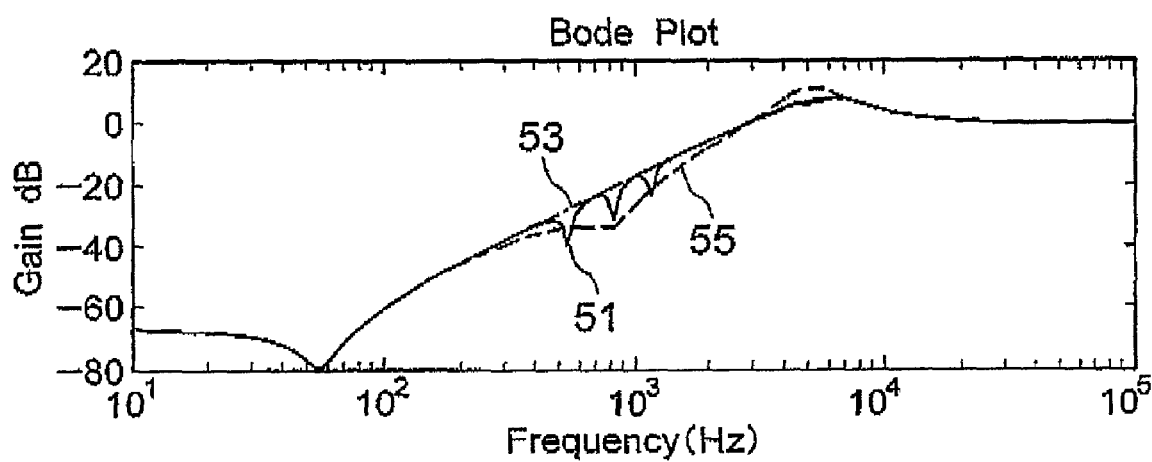
FIGS. 8A and 8B are Bode diagrams each showing the reduction characteristic of a relative position error in the positioning control system.
Figure 8B:
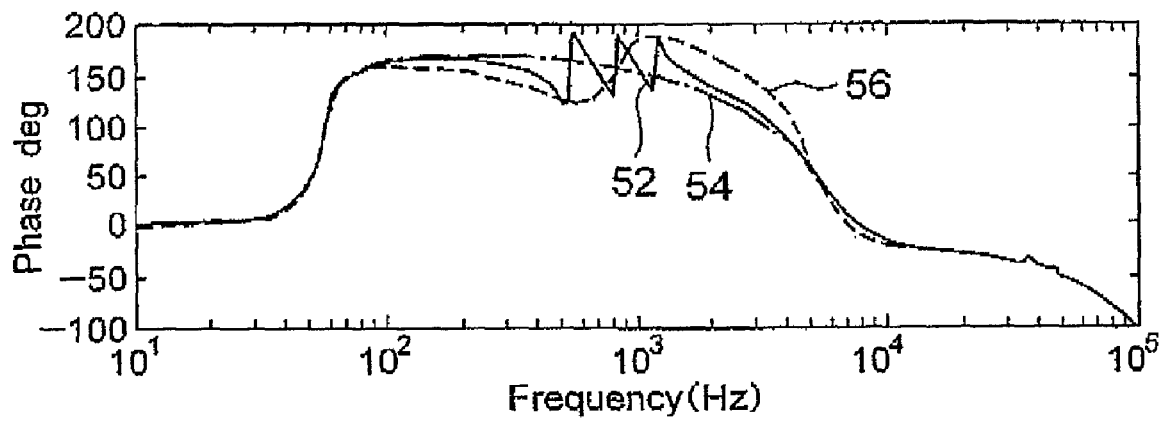

FIGS. 7A and 7B show graphs 41 and 42, respectively, as the frequency characteristic of the path from the relative position error Xe of the positioning control system to the moving distance Xo of the moving member for the case of $f_s$=145 Hz, i.e., the frequency characteristic of the open-loop transfer function of the positioning control system. Graphs 43 and 44 are additionally shown in FIGS. 7A and 7B as the frequency characteristic of the open-loop transfer function of the positioning control system, for the case where the vicinity of the natural resonance frequency is not amplified by the filter 108, i.e., for the case where the F(z) in formula (6-1) is set at F(z)=1. Further, graphs 51 and 52 are shown in FIGS. 8A and 8B as the frequency characteristic of the path from the positioning target position Xi to the relative position error Xe, i.e., the reduction characteristic of the relative position error of the positioning control system. In FIGS. 5A and 8B, the reduction characteristic of the relative position error of the positioning control system for the case where F(z)=1 in the formula (6-1) is additionally shown by graphs 53 and 54. A smaller gain in the gain diagram of FIGS. 8A and 8B can be estimated to provide a higher tracking performance by the positioning control system.

With reference to FIGS. 7A and 7B, it is understood that the control band and the margin of stability of the positioning control system are scarcely changed in general between the case (graphs 41 and 42) where the vicinity of the natural resonance frequency is amplified by the filter and the case (graphs 43 and 44) where the vicinity is not amplified. With referenced to FIGS. 8A and 8B, it is understood that the tracking performance by the positioning control system is around 10 dB improved in the frequency ranges in the vicinity of the natural resonance frequencies of the optical disc medium 101, by amplifying the vicinities of the natural resonance frequencies separately from one another by using the filter 108. Thus, the present embodiment provides a positioning control unit that allows the laser-focused-beam spot 103 to track the positioning target position with the sufficient accuracy even if the fluctuation of the positioning target position is increased due to the natural vibration of the optical disc medium 101.

Figure 9A:
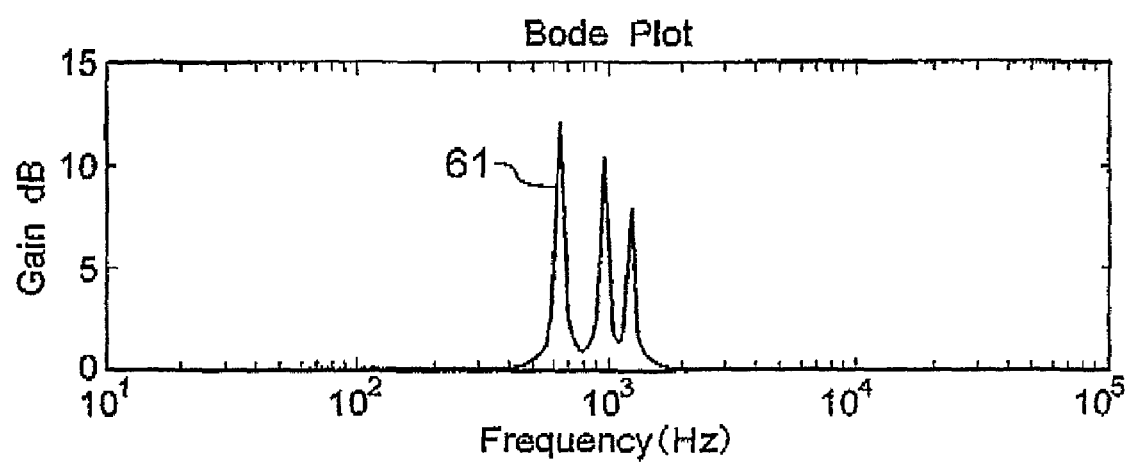
FIGS. 9A and 9B are Bode diagrams each showing the filter characteristic corresponding to $f_s=180$ Hz.
Figure 9B:
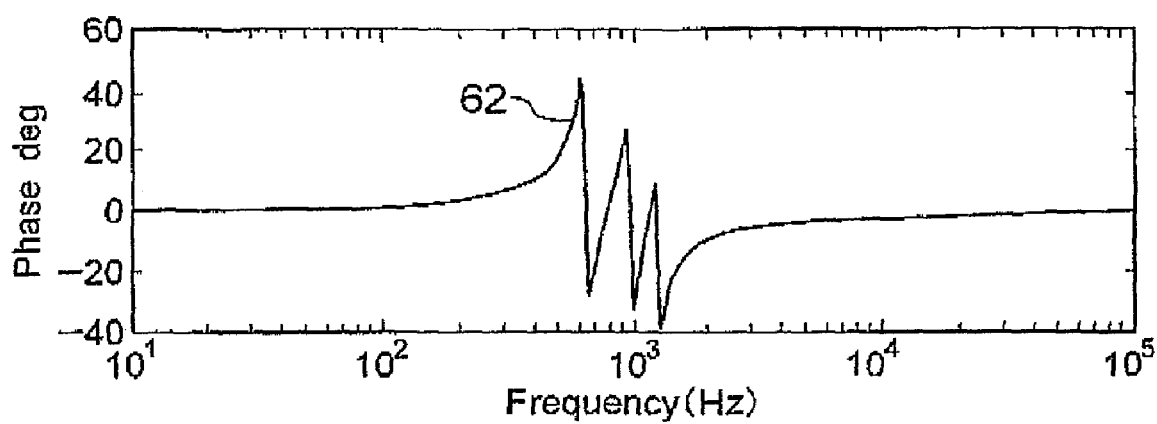

If the rotational speed of the optical disc medium 101 is changed, the rotational-period detection circuit 122 detects this change, and the filter-coefficient setting circuit 121 changes the filter characteristic of the filter 108 based on the change of the rotational speed. For example, when the rotational speed is changed to $f_s$=180 Hz, the filter-coefficient setting circuit 121 estimates the $\omega_{(a,b)}$ corresponding to $f_s$=180 Hz by using the formula (6-2), and outputs the same to the filter 108. Graphs 61 and 62 in FIGS. 9A and 9B each show the Bode diagram of the filter 108 of the formula (6-1) for the case of $f_s$=180 Hz in the formula (6-2). In this case, the focus error signal 106 is amplified by the filter 108 in the vicinity of the frequencies of 647 Hz which is the natural resonance frequency in the mode (2, 1), 976 Hz which is the natural resonance frequency in the mode (3, 1) and 1264 Hz which is the natural resonance frequency in the mode (4, 1). The filter-coefficient setting circuit 121 configures a frequency estimation unit.

Figure 10A:
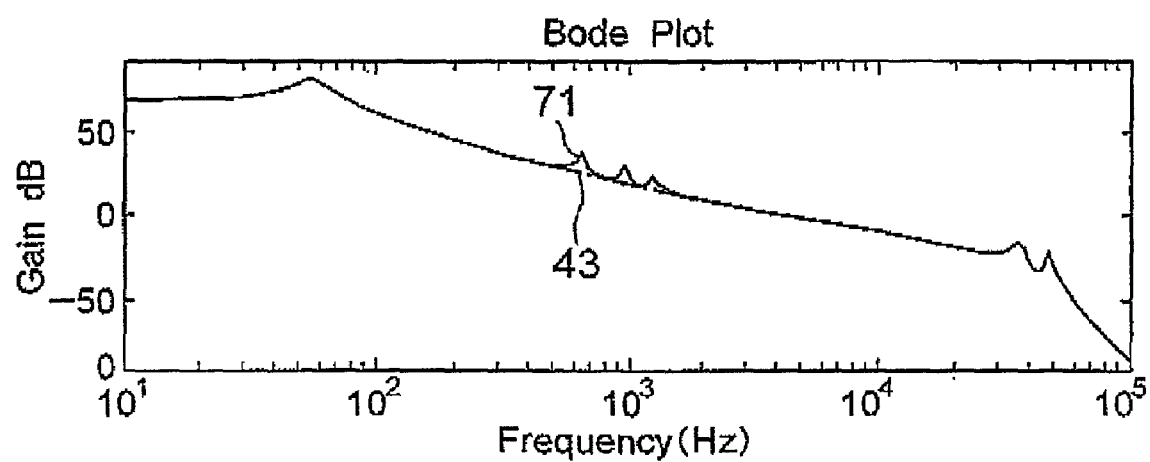
FIGS. 10A and 10B are Bode diagrams each showing the frequency characteristic of the open-loop transfer function in the positioning control system for the case of $f_s=180$ Hz.
Figure 10B:
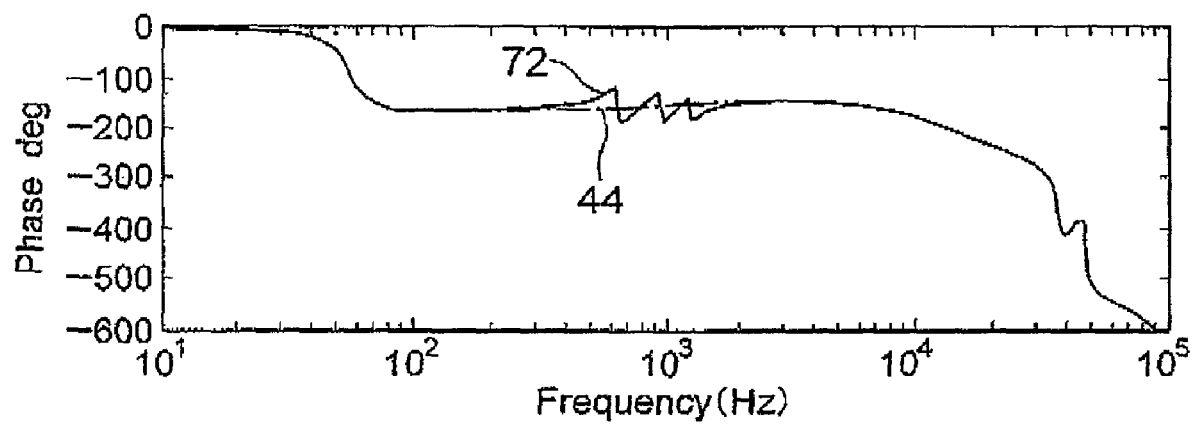
Figure 11A:
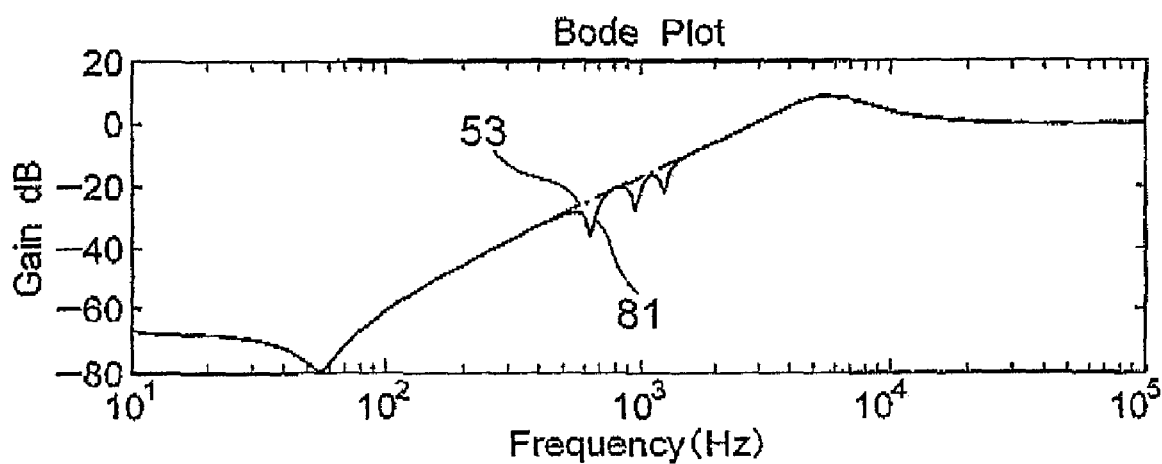
FIGS. 11A and 11B are Bode diagrams each showing the reduction characteristic of relative position error of the positioning control system for the case of $f_s=180$ Hz.
Figure 11B:
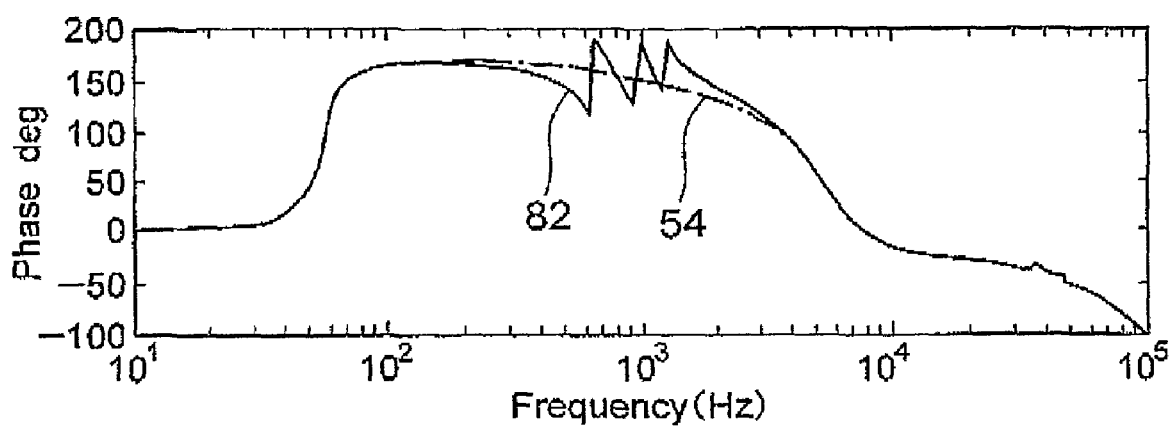

Graphs 71 and 72 in FIGS. 10A and 10B each show the frequency characteristic of the open-loop transfer function of the positioning control system for the case of $f_s$=180 Hz. Graphs 81 and 82 in FIGS. 11A and 11B each show the reduction characteristic of the relative position error of the positioning control system. Comparing the graphs 41 and 42 in FIGS. 7A and 7B; graphs 71 and 72 in FIGS. 10A and 10B, graphs 51 and 52 in FIGS. 8A and 8B, and graphs 81 and 82 in FIGS. 11A and 11B against one another, it will be understood that the present embodiment provides a positioning control unit which is capable of allowing the laser-focused-beam spot 103 to track the positioning target position of the optical disc medium 101 with a sufficient accuracy even if the natural resonance frequency of the optical disc medium 101 is changed along with the change of rotational frequency of the optical disc medium 101.

As described heretofore, in the present embodiment, the frequency components are amplified separately from one another by the filter 108 in the vicinity of the natural resonance frequencies of the natural vibration modes selected beforehand from the natural vibration modes of the optical disc medium 101. As a comparison example, a case will be considered where the vicinities of the natural resonance frequencies are not amplified separately from one another, and for example, the components in the vicinity of the natural resonance frequencies of the mode (2, 1), mode (3, 1) and mode (4, 1) are collectively amplified. In this case, it is appropriate to use, as the filter 108, a filter configured by the following formulas (7-1) and (7-2):

$F'(z) = Z[F'_{(3,1)}(s)]$, $F'_{(3,1)}(s) = (s^2 + 2\zeta'_{n(3,1)}\omega_{(3,1)}s + \omega_{(3,1)}^2)/(s^2 + 2\zeta'_{d(3,1)}\omega_{(3,1)}s + \omega_{(3,1)}^2)$, and $\zeta'_{n(3,1)} = 0.8, \zeta'_{d(3,1)} = 0.2$ \hfill (7-1); and $\omega_{(3,1)} = 2\pi[4.02f_s + 252]$ \hfill (7-2).

The filter defined by the above formulas (7-1) and (7-2) collectively amplifies the frequency component in the vicinity of the natural resonance frequency of the mode (3, 1) together with the frequency components in the vicinity of the mode (2, 1) and mode (4, 1). Graphs 33 and 34 in FIGS. 6A and 6B each show the Bode diagram of the filter defined by the above formulas (7-1) and (7-2) for the case of f=145 Hz.

If the filter is configured by the formulas (7-1) and (7-2), as in the case considered as the comparative example, it is difficult to improve the tracking performance, as compared to the case where the natural resonance frequencies are amplified separately from one another, because the phase characteristic of the filter varies in a wider frequency range. More specifically, in the comparative example, the frequency characteristic of the open-loop transfer function of the positioning control system and the reduction characteristic of the relative position error are such that additionally shown by graphs 45 and 46 in FIGS. 7A and 7B and by graphs 55 and 56 in FIGS. 8A and 8B. Thus, the margin of the stability of the positioning control system and the tracking performance in the frequency range in the vicinity of the frequency at which the gain in the frequency characteristic of the open-loop transfer function is zero (i.e., control-band frequency) are considerably reduced. In the present embodiment, the components in the vicinity of the natural resonance frequencies of the natural vibration modes selected from the natural vibration modes of the optical disc medium 101 are amplified separately from one another, whereby the laser-focused-beam spot 103 can track the target position with a sufficient accuracy even if the fluctuation of the positioning target position is increased due to the natural vibration of the optical disc medium 101.

Figure 12:
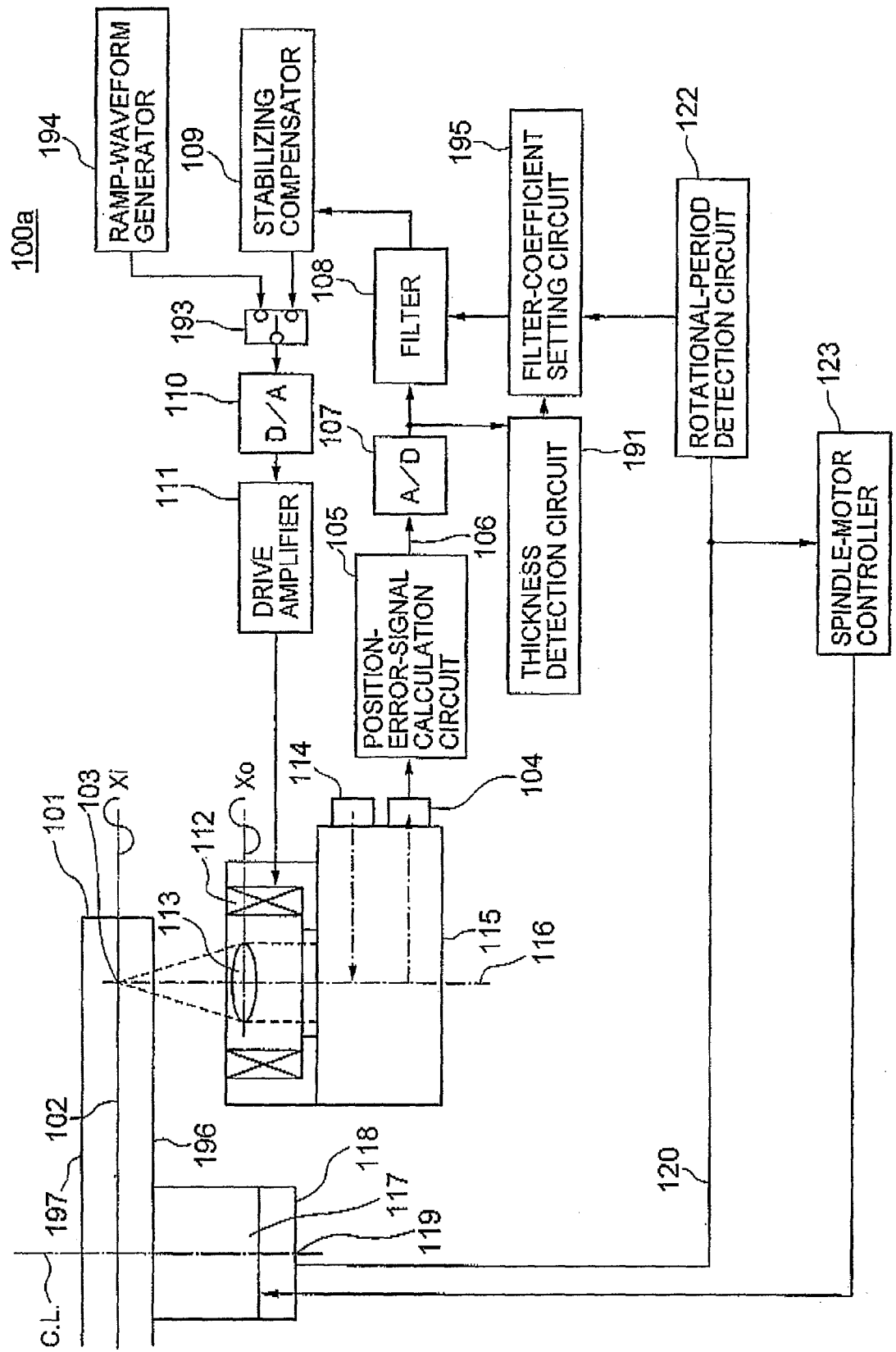
FIG. 12 is a block diagram showing part of an optical disc drive including a positioning control unit according to a second embodiment of the present invention.

FIG. 12 shows part of configuration of an optical disc drive including a positioning control unit according to a second embodiment of the present invention. The optical disc drive 100a of the present embodiment includes, in addition to the configuration of the optical disc drive 100 (FIG. 1) of the first embodiment, a thickness detection circuit 191, a selector 193, and a ramp-waveform generator 194. The thickness detection circuit 191, selector 193, and ramp-waveform generator 194 configure a thickness measurement device.

Generally, a tolerance is permitted as to the outside diameter dimension in the optical disc medium. For example, in the optical disc medium compliant with the physical standard of HD DVD, DVD, CD etc. having a nominal diameter of 120 mm and a nominal thickness of 1.2 mm, a tolerance of ±0.30 mm in the diameter and +0.3 mm and −0.06 mm in the thickness of the user data area are permitted. The natural resonance frequency of the optical disc medium changes depending on the outside dimension, and in particular, the ratio of the tolerance to the nominal thickness is larger than the ratio of the tolerance to the nominal diameter, whereby change of the natural resonance frequency caused by the range of thickness variation cannot be disregarded.

Figure 13:
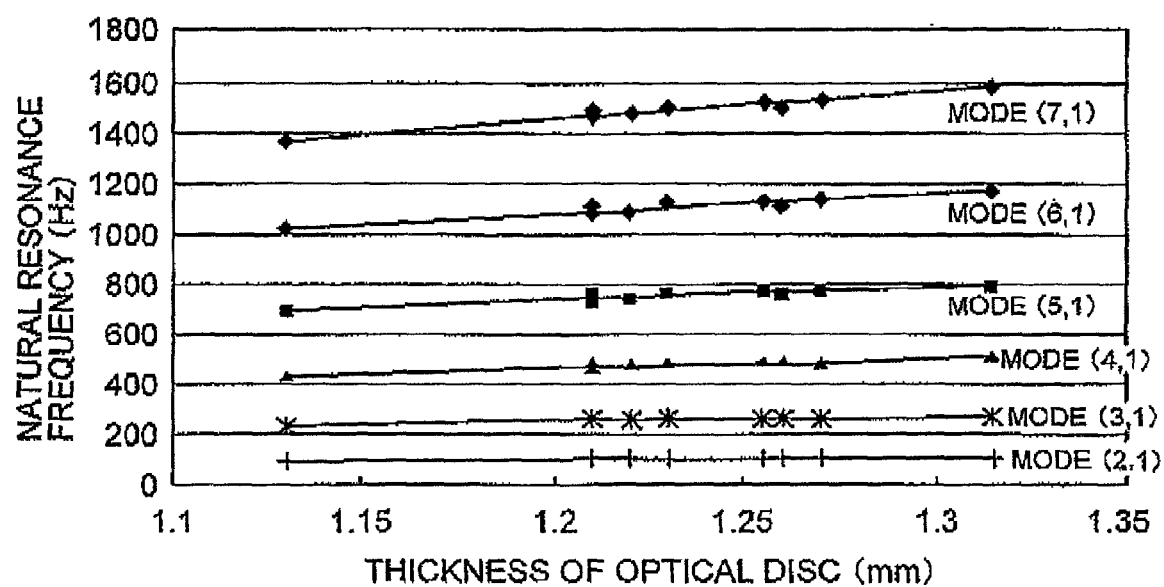
FIG. 13 is a graph showing the relationship between the thickness of an optical disc medium and the natural resonance frequency thereof.

FIG. 13 shows the relationship between the thickness of the optical disc medium and the natural resonance frequency. This figure shows the change of natural resonance frequency with respect to the thickness of the optical disc medium, similarly to FIG. 4, with respect to the natural vibration modes from the mode (2,1) to the mode (7, 1) shown in FIG. 2. FIG. 13 also shows the natural resonance frequency when the optical disc medium is not rotated. As shown in this figure, the natural resonance frequency of each mode of the optical disc medium changes along with the increase in the thickness of the optical disc medium, and have a different value for the natural resonance frequency depending on the individual specificity, even if the thickness of the optical disc medium is within the range of tolerance.

Thus, in the present embodiment, the thickness of the optical disc medium 101 is measured by the thickness detection circuit 191, and the natural resonance frequency corresponding to the detected thickness is estimated in the filter-coefficient setting circuit 195. The ramp-waveform generator 194 generates, upon detection of the thickness, a signal for continuously moving the laser-focused-beam spot 103 in the range from the first surface 196 of the optical disc medium 101 near the optical head 115 to the second surface 197. The thickness detection circuit 191 observes the focus error signal 106, and measures the distance from the first surface 196 to the second surface 197 of the optical disc medium 101, i.e., the thickness of the optical disc medium 101.

Operation in the detection of thickness of the optical disc medium 101 will be described in detail. It is assumed that the working distance of the objective lens 113, i.e., the distance between the end surface of the mirror frame of the objective lens when the laser-focused-beam spot 103 is focused on the positioning target position of the information recording layer 102 and the first surface 196 of the optical disc medium 101 is 1.5 mm. It is also assumed that the photodetector 104 is adapted to detection of the focus error signal by using a knife-edge method. If the laser-focused-beam spot 103 is moved along the optical-axis direction 116, the focus error signal 106 includes an S-character waveform which is observed when the laser-focused-beam spot 103 crosses the surfaces 196 and 197 as well as the information recording layer 102 of the optical disc medium 101, and assumes a substantially constant value in other portion. Accordingly, by measuring the time interval of detection of the focus S-character corresponding to the first surface 196 and second surface 197, the thickness information of the optical disc medium 101 can be obtained.

FIG. 14 shows the operating waveform of each part upon measurement of the thickness. The system controller, which is not illustrated and performs overall control of the operation of the optical disc drive 100*a*, issues a command for execution of the measurement of thickness of the optical disc medium 101. Upon receiving this command, the thickness detection circuit 191 allows the selector 193 to select the output of the ramp-waveform generator 194, and instructs the ramp-waveform generator 194 to output the data for measuring the thickness. The ramp waveform generator 194, which receives the command, outputs a signal (data-0) corresponding to the position of the laser-focused-beam spot 103 in the optical-axis direction 116 being nearer to the optical head 115 than the first surface 196 of the optical disc medium 101. This data-0 is input to the D/A converter 110 via the selector 193, and converted into an analog value. Thereafter, the focus actuator 112 is driven by the drive amplifier 111 based on the analog value, whereby the laser beam is focused on a position nearer to the first surface 196 of the optical disc medium 101 than the optical head 115.

The ramp-waveform generator 194 outputs, after delivering data-0 at a time instant (time instant t0) for starting the thickness measurement, a ramp waveform 1001 which is changed at a fixed rate with respect to the elapsed time, thereby gradually moving the laser-focused-beam spot 103 in the direction from the optical head 115 toward the optical disc medium 101. The thickness detection circuit 191 receives the focus error signal 106 converted into the digital data by the A/D converter 107, and observes the focus S-character signal. If the laser-focused-beam spot 103 has not yet arrived at the first surface 196 of the optical disc medium 101, the focus error signal 106 assumes a direct-current value, and the focus S-character signal is not observed.

The laser-focused-beam spot 103 is driven by the output signal of the ramp-waveform generator 194, and then at time instant t1, the laser-focused-beam spot 103 reaches the first surface 196 of the optical disc medium 101 and passes through the surface 196, whereby the focus S-character signal 1002 is observed in the focus error signal 106. The thickness detection circuit 191 operates, upon detecting this focus S-character signal 1002, a counter not shown, which counts based on the clock signal, thereby starting measurement of the time. The thickness detection circuit 191 judges, upon detecting that the focus error signal 106 assumes a value equal to or larger than zero after assuming a value equal to or smaller than a specific threshold d0, that the focus S-character signal is observed.

When the laser-focused-bean spot 103 moves from the first surface 196 of the optical disc medium 101 toward the second surface 197 and resides between the first surface 196 and the information recording layer 102, the focus error signal 106 assumes a direct-current value. When the laser-focused-beam spot 103 then reaches the information recording layer 102 and passes through the information recording layer 102 at time instant t2, the focus S-character signal 1003 is observed. When the laser-focused-beam spot 103 then reaches the second surface 197 of the optical disc medium 101 and passes through the second surface 197 at time instant t3, the focus S-character signal 1004 is observed in the focus error signal 106.

If the signal output from the ramp-waveform generator 194 assumes a signal (data-1) corresponding to the end position of the thickness measurement at time instant t4, the movement of the laser-focused-beam spot 103 is ended. It is sufficient that the end position of the thickness measurement be set at a position where the objective lens 113 does not contact the first surface 196 of the optical disc medium 101 with a specific margin, and where the laser-focused-beam spot 103 is located at the rear side of the second surface 197.

If the optical disc medium 101 includes a single information recording layer 102, the focus S-character signal is observed at a total of three positions including the first and second surfaces 196 and 197 and the information recording layer 102. Among those, the second focus S-character signal 1003 observed at time instant t2 corresponds to the information recording layer 102, and the thickness detection circuit 191 stops the counter upon observing the focus S-character signal 1004 at time instant t3. The count of the counter corresponds to the time length between time instant t1 and time instant t3, and the thickness of the optical disc medium 101 is detected based on this time length. In the present embodiment, the time length between data-0 and data-1 output from the ramp-waveform generator 194, i.e., time length from time instant t0 to time instant t4 is set sufficiently longer than the longest time constant of the system defined by the above formula (4), whereby the time difference t3−t1 is determined to be approximately proportional to the thickness of the optical disc medium 101. Therefore, it is determined that the thickness detection circuit 191 delivers a value proportional to (t3−t1) to the filter-coefficient setting circuit 195 as the thickness information td of the optical disc medium 101.

The thickness detection circuit 191 delivers, upon measuring the thickness of the optical disc medium 101, the thickness information to the filter-coefficient setting circuit 195. It should be noted that the thickness detection circuit 191 outputs a default of 1.2 mm as the thickness information in the initial state, such as after turn ON of the power supply to the optical disc drive 100*a*. The filter-coefficient setting circuit 195 estimates the natural resonance frequency of the optical disc medium 101 based on the thickness information output from the thickness detection circuit 191 and the rotational-speed information output from the rotational-period detection circuit 122, thereby determining the coefficients of the filter 108. The filter-coefficient setting circuit 195 iteratively changes the coefficients of the filter 108 based on updated thickness information and updated rotational-speed information each time the thickness information is updated or the rotational-speed information is updated.

The filter 108 is configured by a filter having a transfer function F(s) defined by the following formula (8-1):

$$F(s)=\Pi_{[a-2,4;b=1]}(s^2+2\zeta_{n(a,b)}\omega_{(a,b)}s+\omega_{(a,b)}^2)/(s^2+2\zeta_{d(a,b)}\omega_{(a,b)}s+\omega_{(a,b)}^2) \quad (8\text{-}1),$$

where $\zeta_{n(a\ b)} > \zeta_{d(a,b)} > 0$

Since the filter 108 is configured by a digital-signal filter, the above formula (8-1) is used after transforming the same into the following formula (9-1):

$$F(z)=Z[F_{(2,1)}(s)F_{(3,1)}(s)F_{(4,1)}(s)]$$

$$F_{(a,b)}(s)=(s^2+2\zeta_{n(a,b)}\omega_{(a,b)}s+\omega_{(a,b)}^2)/(s^2+2\zeta_{d(a,b)}\omega_{(a,b)}s+\omega_{(a,b)}^2),\ a=2,3,4,\ b=1$$

$$\zeta_{(n(2,1)}=0.080, \zeta_{d(2,1)}=0.020;$$

$$\zeta_{(n(3,1)}=0.064, \zeta_{d(3,1)}=0.020;\ \text{and}$$

$$\zeta_{(n(4,1)}=0.050, \zeta_{d(4,1)}=0.020 \quad (9\text{-}1).$$

The filter-coefficient setting circuit 195 approximates the change of the natural resonance frequencies with respect to the thickness shown in FIG. 13 by using a primary function, and estimates the natural resonance frequency of each mode according to the following formula (8-2):

$$\omega_{(a,b)} = 2\pi[C_1(a,b)f_s + C_0(a,b)t_d + f'_{0(a,b)}] \quad (8\text{-}2).$$

The $t_d$ in formula (8-2) represents thickness (mm) of the optical disc medium 101, the $C_{0(a,b)}$ represents the gradient (Hz/mm) when the change of the natural resonance frequency accompanying the change of the thickness of the optical disc medium of FIG. 13 is primarily approximated, and the $f'_{0(a,b)}$ is the zero-order coefficient (Hz). Concretely, the natural resonance frequency of each mode is estimated based on the rotational-speed information $f_s$ output from the rotational-period detection circuit and the thickness $t_d$ output from the thickness detection circuit by using the following formula (9-2):

$$\omega_{(2,1)} = 2\pi[3.03 f_s + 71.7 t_d + 15.5];$$

$$\omega_{(3,1)} = 2\pi[4.02 f_s + 192.4 t_d + 21.0]; \text{ and}$$

$$\omega_{(2,1)} = 2\pi[3.03 f_s + 71.7 t_d + 24.4] \quad (9\text{-}2).$$

If $t_d=1.2$ mm is assumed in the formula (9-2), the natural resonance frequency of each mode is approximately equivalent to the natural resonance frequency estimated by the filter-coefficient setting circuit 121 in the first embodiment shown in formula (6-2), and in this case, the characteristic of the filter 108 is equivalent between the first embodiment and the second embodiment.

Figure 15A:
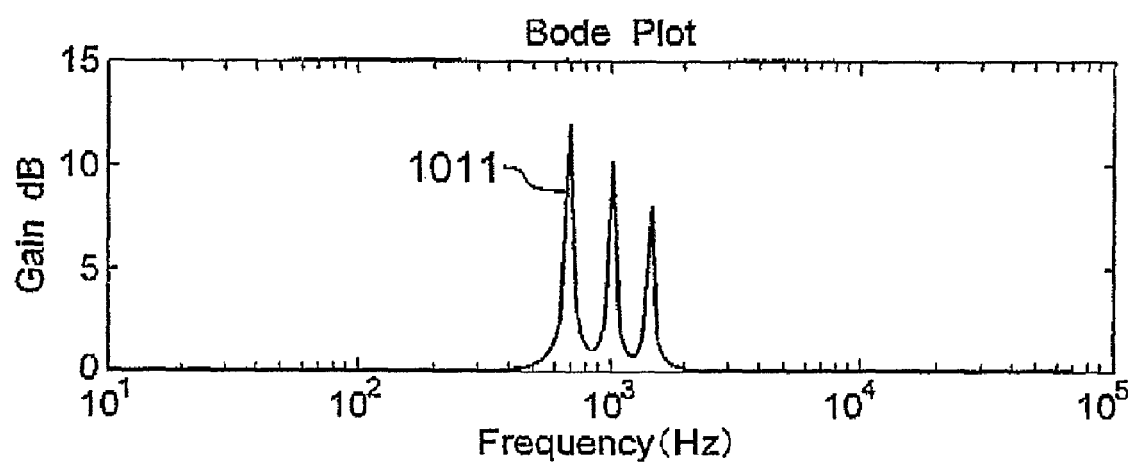
FIGS. 15A and 15B are Bode diagrams each showing the filter characteristic.
Figure 15B:
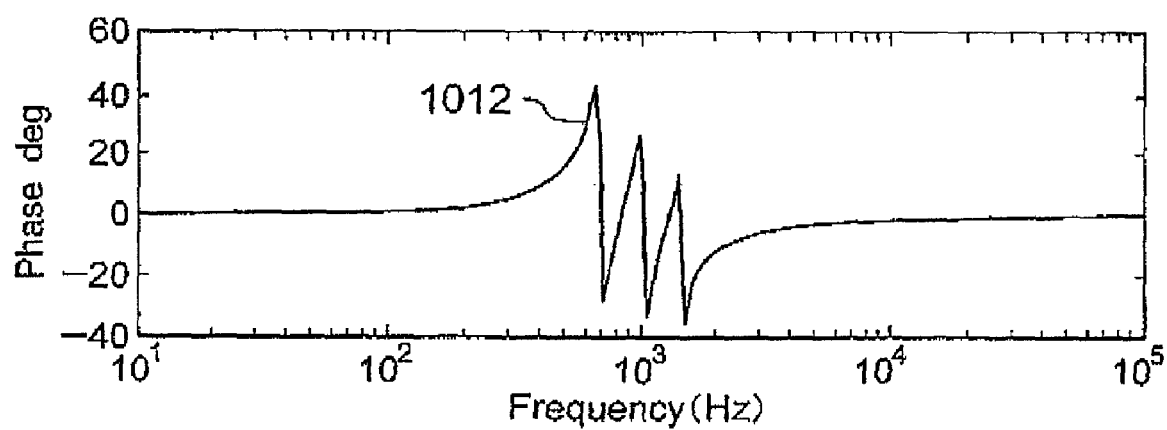

Graphs 1011 and 1012 in FIGS. 15A and 15B each show the Bode diagram of the filter 108 of formula (9-1) assuming that $f_s$ 180 Hz and $t_d$ 1.5 mm in formula (9-2). With reference to these drawings, it will be understood that by inputting the focus error signal 106 to the filter 108 similarly to the first embodiment, components in the vicinity of frequencies of 688 Hz which is the natural resonance frequency of mode (2,1), 1033 Hz which is the natural resonance frequency of mode (3,1), and 1474 Hz which is the natural resonance frequency of mode (4,1) of the focus error signal 106 are amplified separately from one another.

Figure 16A:
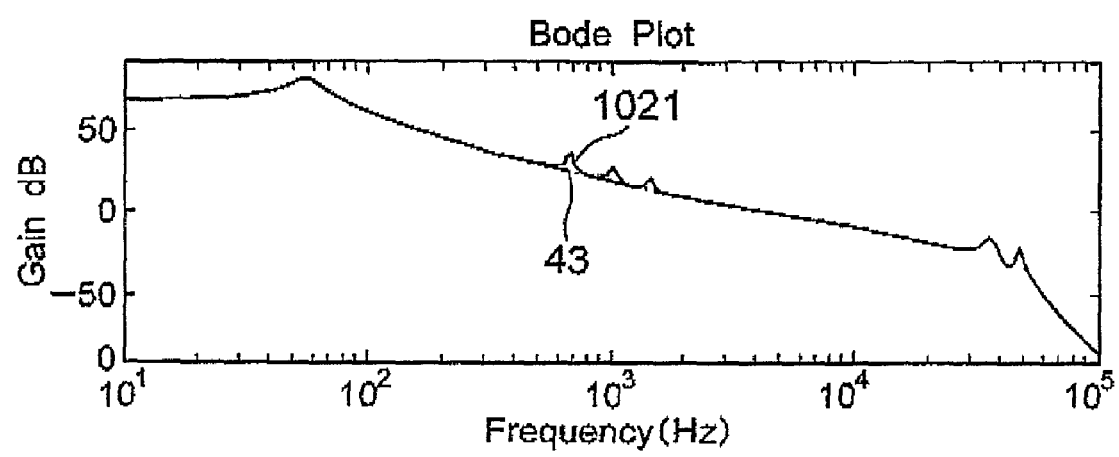
FIGS. 16A and 16B are Bode diagrams each showing the frequency characteristic of the open-loop transfer function of the positioning control system.
Figure 16B:
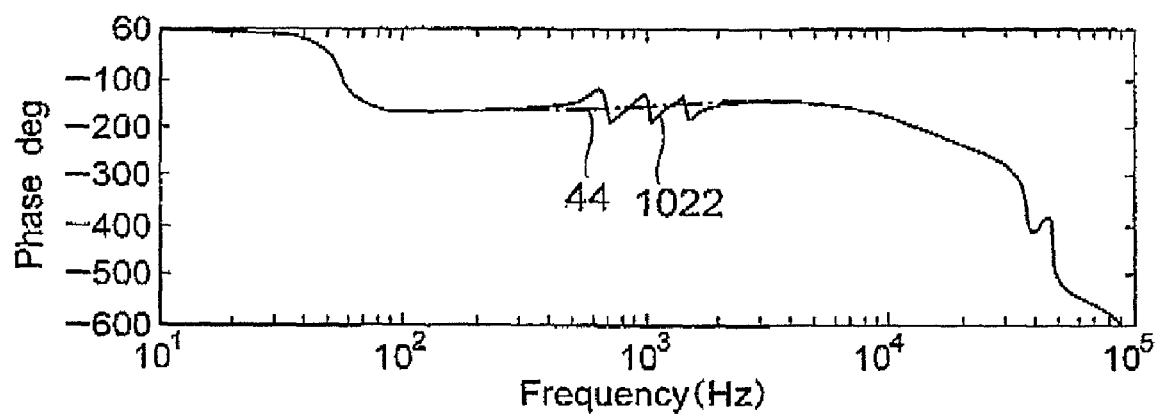
Figure 17A:
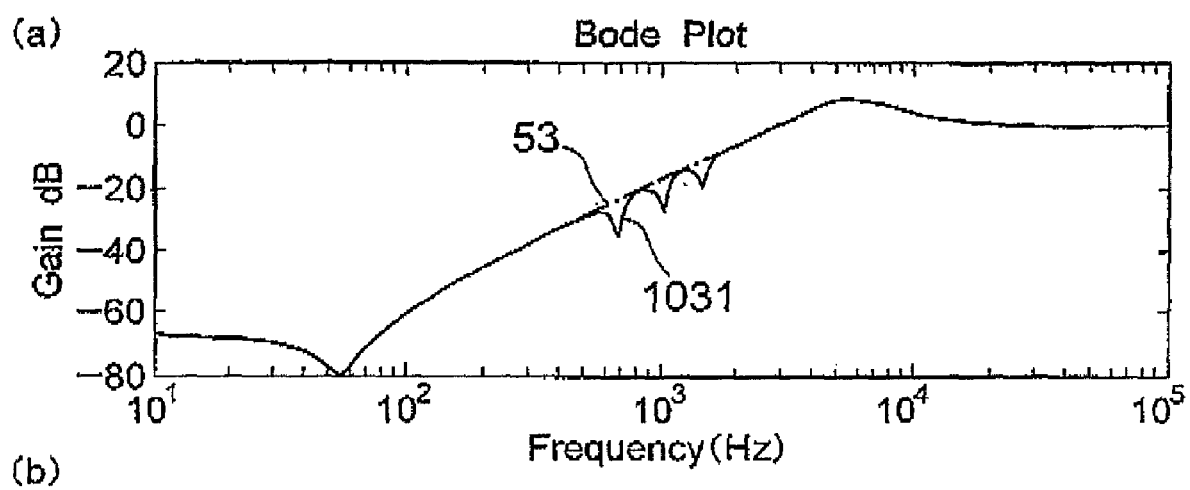
FIGS. 17A and 17B are Bode diagrams each showing the reduction characteristic of relative position error of the positioning control system.
Figure 17B:
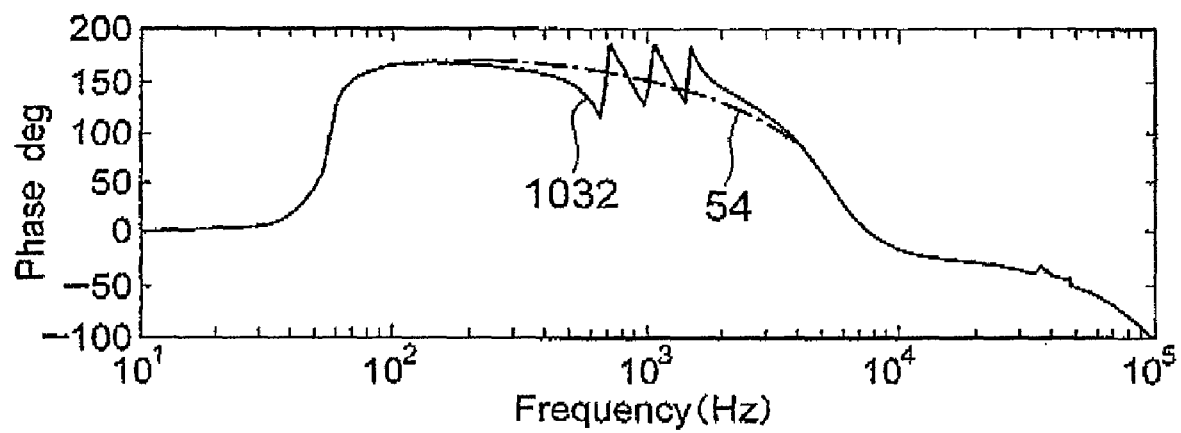

Graphs 1021 and 1022 in FIGS. 16A and 16B each show the frequency characteristic of the open-loop transfer function of the positioning control system for the case of $f_s$=180 Hz and $t_d$=1.5 mm. Graphs 1031 and 1032 in FIGS. 17A and 17B each show reduction characteristic of the relative position error of the positioning control system. Graphs 43 and 44 in FIG. 16 each additionally show the frequency characteristic of the open-loop transfer function of the positioning control system for the case of F(z) of formula (9-1) being set at F(z)=1, whereas graphs 53 and 54 in FIG. 17 each additionally show the reduction characteristic of the relative position error of the positioning control system for the case of F(z)=1 in formula (9-1). With reference to FIGS. 16 and 17, by amplifying, separately from one another, the components in the vicinity of the natural resonance frequencies of the natural vibration modes selected from the natural vibration modes of the optical disc medium 101, similarly to FIGS. 7 and 8, the laser-focused-beam spot 103 can track the target position with a sufficient accuracy even if the fluctuation of the positioning target position is increased due to the natural vibration of the optical disc medium 101.

In the present embodiment, the thickness of the optical disc medium 101 and the natural resonance frequency corresponding to the rotational speed are estimated by the filter-coefficient setting circuit 195, and the filter property of the filter 108 is set based on the estimated natural resonance frequency. Due to this configuration, the laser-focused-beam spot 103 is allowed to track the positioning target position of the information recording layer 102 of the optical disc medium O1 with a sufficient accuracy, even if the optical disc medium O1 has an individual specificity in the thickness thereof, in addition to the advantage achieved by the first embodiment, Although the laser-focused-beam spot 103 is moved from the first surface 196 to the second surface 197 of the optical disc medium 101 to measure the thickness of the optical disc medium 101 based on the time difference of passing through both the surfaces in the second embodiment the configuration is not limited thereto. Since the optical disc medium compliant with the physical standard of HD DVD and DVD, for example, has the structure obtained by bonding together two substrates having a thickness of 0.6 mm, the optical disc medium has a practical thickness double the thickness of a single substrate. Since the time t2–t1 corresponds to the thickness from the first surface 196 of the optical disc medium 101 to the information recording layer 102, i.e., the substrate thickness in FIG. 14, a configuration may be employed wherein the thickness detection circuit 191 outputs, after observing the focus S-character signal 1003 corresponding to the information recording layer 102 at time instant t2, a value proportional to (t2–t1)×2 as the thickness information td. In this case, it is not necessary to move the laser-focused-beam spot 103 up to the second surface 197, whereby the time length needed for obtaining the thickness information may be reduced.

Although an optical disc medium having a single layer on each side thereof and compliant with the HD DVD standard is assumed as the optical disc medium 101 in FIG. 14, the optical disc medium 101 is not limited thereto, and may be configured by a multi-layer medium. For example, if it is an optical disc medium having two layers on each side and compliant with the HD DVD standard, the optical disc medium 101 has the structure obtained by bonding together two polycarbonate substrates each having a thickness of 0.6 mm and including an information recording layer by using a ultra-violet-ray cured resin, with the information recording layer being inside the disc, and includes an intermediate layer made of ultra-violet-ray cured resin used for the bonding.

If the focus error signal is observed on the optical disc medium having the above structure including two layers while moving the laser-focused-beam spot from one surface toward the other surface, the focus S-character signal is observed for a total of four times, i.e., on both the substrate surfaces and the two information recording layers. In this case, it is sufficient to calculate the thickness of the optical disc medium based on the time difference between the first focus S-character signal and the fourth focus S-character signal corresponding to both the surfaces. Thus, if there are a plurality of information recording layers, the thickness of the optical disc medium can be measured by setting the number of times for the appearance of the focus S-character signal based on the number of information recording layers.

In the above description, the thickness of the optical disc medium is calculated from the time difference between the first focus S-character signal and the fourth focus S-character signal; however, in practical, the thickness of the optical disc medium may be calculated by obtaining a thickness from the substrate surface to the information recording layer and another thickness between both the information recording layers, and calculating from these thicknesses. In this case, the thickness from the surface of the optical disc medium to the information recording layer is obtained based on the time difference between the first focus S-character signal and the second focus S-character signal, the thickness of the intermediate layer between the information recording layers is obtained based on the time difference between the second focus S-character signal and the third focus S-character signal, and the thickness of the optical disc medium is obtained by adding together double the thickness from the surface to the information recording layer and the thickness of the intermediate layer.

The above measurement of the optical disc medium may be performed on an optical disc medium compliant with the CD standard and having the structure wherein information recording layers are layered on a substrate made of polycarbonate having a nominal thickness of 1.2 mm. In the case of the optical disc medium compliant with the CD standard, when the laser-focused-beam spot is moved from outside of one surface of the optical disc medium toward the information recording layer along the optical-axis direction, the focus S-character signal is observed twice in total, i.e., on the one surface of the optical disc medium and on the information recording layer. It is sufficient to use a value proportional to the time difference between the two focus S-character signals as the thickness of the optical disc medium.

The above exemplary embodiment describes the optical disc media, such as HD DVD, DVD and CD including as the main component thereof polycarbonate having a nominal diameter of 120 mm and a nominal thickness of 1.2 mm; however, the nominal diameter and nominal thickness of the optical disc medium are not limited thereto The present invention is also applicable to the optical disc medium having a nominal diameter of 80 mm, for example. Optical disc media include an optical disc medium having the same diameter and the same thickness as HD DVD etc., and including polycarbonate and another material as the main component, such as a Blu-ray disc, and the present invention can be applied to such an optical disc medium.

Figure 18:
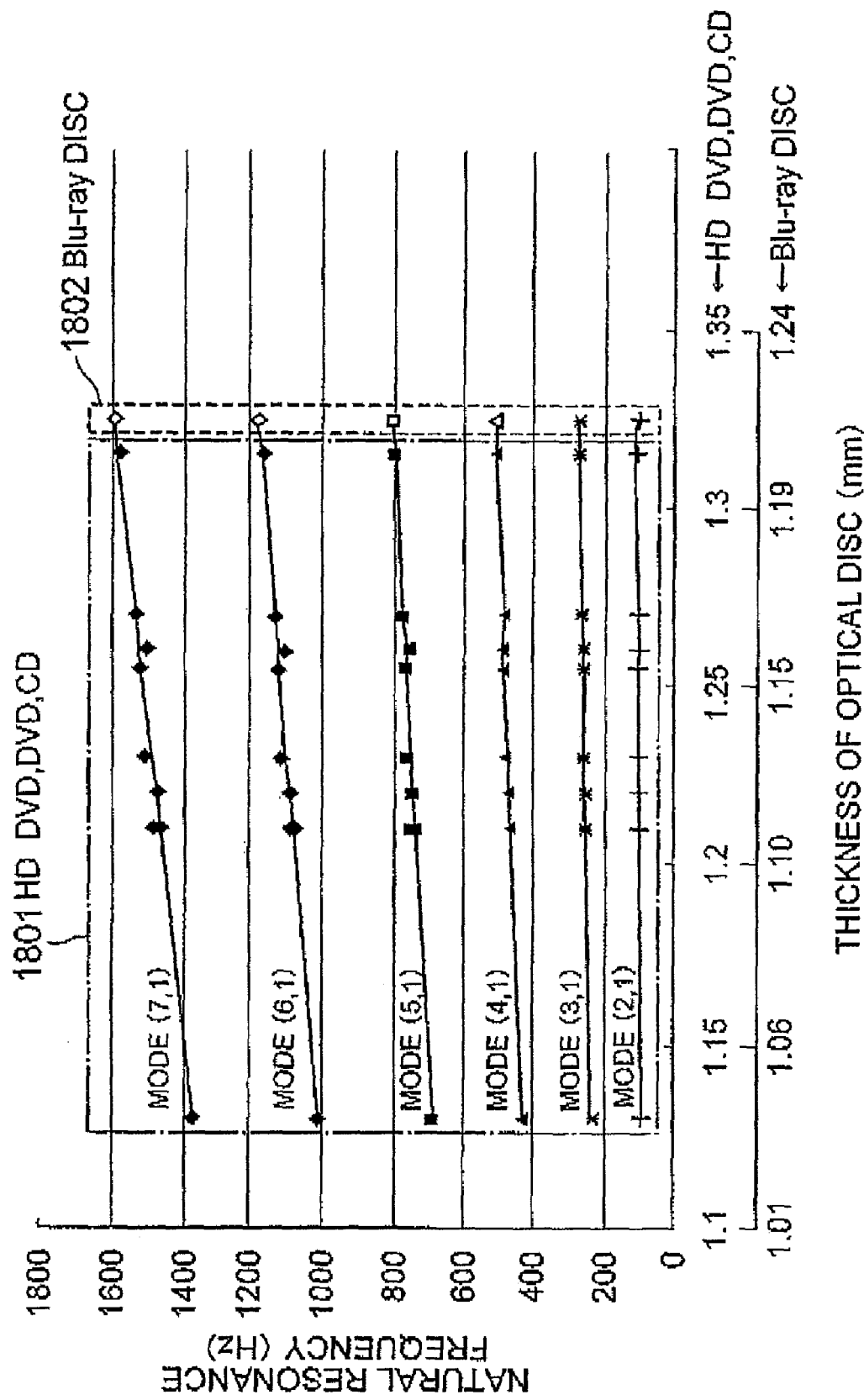
FIG. 18 is a graph showing the relationship between the thickness of the optical disc medium and the natural resonance frequency thereof.

The Blu-ray disc has a nominal diameter of 120 mm and a nominal thickness of 1.2 mm, and has a structure wherein a cover layer made of ultra-violet-ray cured resin having a nominal thickness of 0.1 mm is bonded onto a polycarbonate substrate having a nominal thickness of 1.1 mm, whereby the hardness of the optical disc medium differs from the optical disc medium compliant with the physical standard of HD DVD etc. FIG. 18 shows the relationship between the thickness of the optical disc medium and the natural resonance frequency of each natural vibration mode. In this figure, the natural resonance frequency of the Blu-ray disc enclosed by a rectangle 1802 is added to the relationship, enclosed by a rectangle 1801, between the thickness of the optical disc medium compliant with the physical standards of an optical disc medium such as HD DVD shown in FIG. 13 and the natural resonance frequency.

The Blu-ray disc is harder as compared to other optical discs having the same thickness, such as HD DVD, and the natural resonance frequency of each mode of the Blu-ray disc is equivalent to the natural resonance frequency of the other optical discs, such as HD DVD having an around 1.09-time experimental thickness. Therefore, if the Blu-ray disc is the target optical disc medium for recording and reproducing, it is sufficient to replace the horizontal axis (thickness) read for the optical discs such as HD DVD by a value of 1/1.09 times, to estimate the natural resonance frequency of each mode of the Blu-ray disc based on the thickness of the optical disc medium, as shown in FIG. 18. In this way, the focused-beam spot can track the information recording layer with a sufficient accuracy in the Blu-ray disc as well.

In the optical disc drive, it is general to read the control information etc. recorded beforehand on the optical disc medium, prior to recording the user information on the optical disc medium or prior to reproducing the user information from the optical disc medium, thereby judging the physical standard of the optical disc medium with which the target disc for recording/reproducing is compliant. The natural resonance frequency to be amplified by the filter 108 (FIG. 1, FIG. 12) is determined, or the way of detection of the thickness of the optical disc medium is determined, based on the classification of the physical standard for the recording/reproducing while using the information thus obtained. This also applies to the case where the present invention is applied to the optical disc medium having a nominal diameter of 80 mm.

The positioning control unit of the present invention can be used in combination with the conventional technologies, for example, the technique described in Patent Publication-1, or the technique described in Patent Publication-2. More specifically, by using the configuration of the above exemplary embodiments, the tracking performance of the laser-focused-beam spot with respect to the natural vibration of an optical disc medium that is asynchronous with the rotation of the optical disc medium can be improved, and at the same time, the tracking performance with respect to the position fluctuation that is synchronous with the rotation of the optical disc medium can also be improved by using the configuration similar to the technique described in Patent Publication-1 or Patent Publication-2.

The configuration in FIG. 1 is such that the filter coefficients of the filter 108 are controlled by the filter-coefficient setting circuit 121; however, the configuration is not limited thereto. For example, if the optical disc is operated using a CAV technique and without changing the setting of the number of multiple speed upon recording/reproducing information on the optical disc medium, the rotational speed of the optical disc upon recording/reproducing the information assumes a predetermined fixed value. In such a case, since the natural resonance frequency of the optical disc medium can be approximated by fixed values, the tracking performance can be improved in a practical standpoint even if the coefficients of filter 108 are fixed to the approximate values. More specifically, even in a configuration without using the filter-coefficient setting circuit 121 and rotational-period detection circuit 122 shown in FIG. 1, the tracking performance by the positioning control system can be improved.

In the above exemplary embodiments, an example wherein the positioning control unit is applied to the axial-tracking control unit in the optical disc drive; however, the positioning control unit of the present invention is also applicable to a radial-tracking control unit as well. To describe this with reference to FIG. 1, a spiral guide groove, which is referred to as pre-groove so long as the disc is a recording-use optical disc medium, is formed on the information recording layer 102 of the optical disc medium 101 in the radial direction of the optical disc, whereas an information pit train is spirally disposed in the radial direction of the optical disc so long as the disc is a read-only optical disc medium. The optical disc drive moves (radial-tracking controls) the laser-focused-beam spot 103 for scanning along the information recording track such as guide groove or pit train, to thereby record or reproduce information on the information recording layer of the optical disc medium 101. The fluctuation of the target position due to the natural vibration of the optical disc medium 101, as described with respect to the first embodiment, has a component in the direction of the optic axis 116 as well as a component in the radial direction of the optical disc, and thus the present invention may be applied to the radial-tracking control unit, similarly to the first embodiment, to improve the radial-tracking performance.

More specifically, if the radial-tracking control unit is configured by the positioning control unit of the present invention, as in FIG. 1, the position error detector detects, based on a push-pull technique or DPD (differential phase detection) technique, a tracking error signal which is a relative position error between the information recording track that is the positioning target position and the laser-focused-beam spot 103 in the radial direction of the optical disc, and delivers the same to the filter 108. The drive unit is configured by a track actuator instead of the focus actuator 112, and drives the objective lens 113 in the radial direction of the optical disc by using the output of the stabilizing compensator 109, D/A converter 110, and drive amplifier 111. In this case, the filter 108, position error detector and drive unit in the optical disc drive 100 configure a positioning control system that allows the position of the laser-focused-bean spot 103 to track the information recording track that is the positioning target position of the optical disc medium 101.

Generally, the transfer characteristic of the system wherein the above track actuator and the drive amplifier 111 are serially connected has a frequency characteristic substantially same as that of the formula (4) representing the transfer characteristic of the system wherein the drive amplifier 111 and the focus actuator 112 are serially connected. Therefore, by configuring the radial-tracking control unit as described above, and determining the frequency characteristic of the filter 108 and the stabilizing compensator 109 included in the drive unit similarly to those of the first embodiment, the radial-tracking performance of the radial-tracking control unit can be improved.

In the above embodiments, an example is shown wherein the target member is configured by the optical disc medium and the positioning control unit is mounted on the optical disc drive; however, the configuration is not limited thereto. For example, the positioning control unit of the present invention may be mounted on a hard disc drive, and may be applied to a radial-tracking control unit of the magnetic head in the hard disc drive. In this case, the natural resonance frequency of the hard disc that is the target member, and the mechanical characteristics of the voice coil motor, for example, that drives the magnetic head configuring the drive unit may be discussed similarly to the case of the above optical disc drive, whereby the tracking performance by the positioning control system can be improved by applying the positioning control unit of the present invention thereto.

As described heretofore, the present invention may employ exemplary embodiments as described hereinafter.

In the positioning control unit according to the first aspect of the present invention, the moving member may be driven based on the position error signal obtained by amplifying a signal component in the vicinity of the natural resonance frequency of at least one mode selected from the natural vibration modes of the target member, to allow the moving member to track the target position of the target member. In this way, the moving member is allowed to track the target position with a higher accuracy, even if the target member is excited by an external force etc. in the natural vibration mode, and the target position fluctuates at the frequency of the natural vibration mode thereof.

A configuration may be employed wherein the filter amplifies the component in the vicinity of the natural resonance frequency of at least one natural vibration mode among the secondary-order or higher-order natural vibration modes of the target member. Amplification of the natural-resonance-frequency component in the vicinity of the control band frequency of the positioning control system by using the filter improves the tracking performance of the target member with respect to the target position, without broadening the control band.

A configuration may be employed wherein the filter amplifies, separately from one another, the components in the vicinity of the natural resonance frequencies of a plurality of natural vibration modes selected from the natural vibration modes of the target member. In this case, the tracking performance of the moving member with respect to the target position can be improved as compared to the case where the plurality of natural resonance frequencies are collectively amplified.

In the positioning control unit of the second aspect of the present invention, a configuration may be employed wherein the frequency estimator estimates the natural resonance frequency of at least one natural vibration mode among secondary-order and higher-order natural vibration modes of the target member.

A configuration may be employed wherein the frequency estimator estimates and outputs the natural resonance frequencies of a plurality of natural vibration modes selected from the natural vibration modes of the target member, and the amplifier amplifies, separately from one another, components in the vicinity of the plurality of natural resonance frequencies estimated by the frequency estimator.

In the positioning control unit of the second aspect of the present invention, a configuration may be employed wherein the control unit further includes a rotational-speed-information acquisition device that acquires information of rotational speed of the disc-shaped target member around a rotational axis thereof and wherein the frequency estimator estimates the natural resonance frequency based on the information of rotational speed. In this case, the moving member can track the target position with a sufficient accuracy by changing the natural resonance frequency amplified by the filter depending on the rotational speed, even if the rotational speed of target member is changed and an accompanying change of the natural resonance frequency occurs.

In the positioning control unit of the second aspect of the present invention, a configuration may be employed wherein the positioning control unit further includes a thickness measurement device that acquires thickness information of the disc-shaped target member, and wherein the frequency estimator estimates the natural resonance frequency of the target member based on the thickness information. For example, the thickness of the optical disc medium is specified by the standard; however, the thickness may have an individual specificity in fact due to a range of variation in the manufacturing process. Even in such a case, by measuring the thickness of the target member, and estimating the natural resonance frequency based on the measured thickness in the frequency estimator, the moving member can track the target member with a higher accuracy.

In the optical disc drive of the present invention, a configuration may be employed wherein the optical disc drive her includes a rotational-speed-information acquisition device that acquires information of rotational speed of the optical disc medium around a rotational axis thereof, and wherein the frequency estimator estimates the natural resonance frequency based on the information of rotational speed.

In the optical disc drive of the present invention, a configuration may be employed wherein the optical disc drive further includes a thickness measurement device that acquires thickness information of the optical disc medium, and wherein the frequency estimator estimates the natural resonance frequency of the optical disc medium based on the thickness information.

In the positioning control unit, the moving member may be driven based on the position error signal obtained by amplifying the signal components in the vicinity of the natural resonance frequencies of the resonance vibration modes of the target member, to track the target position of the target member. In this way, the moving member can track the target position with a higher accuracy even if the target member is excited in the natural vibration mode by an external force etc. to cause a fluctuation having the frequency of the natural vibration mode occurring at the target position.

In the optical disc drive, the focused-beam spot may be driven based on the position error signal obtained by amplifying the signal component in the vicinity of the natural resonance frequency of the natural vibration mode of the optical disc medium by using the filter, to track the target position of the optical disc medium. In this way, the focused-beam spot can track the target position of the optical disc medium with a higher accuracy, even if the optical disc medium is excited in the natural vibration mode by an external force etc. to cause a fluctuation having the frequency of the natural vibration mode occurring at the target position.

In the optical disc drive of the above embodiment, the frequency estimator may estimate the natural resonance frequency of at least one mode selected from the natural vibration modes of the disc medium, and the focused-beam spot may be driven based the position error signal obtained by amplifying the signal component in the vicinity of the natural resonance frequency estimated by the frequency estimator, to track the target position of the optical disc medium. In this way, the focused-beam spot can track the target position of the optical disc medium with a higher accuracy, even if the optical disc medium is excited in the natural vibration mode by an external force etc. thereby causing a fluctuation having the frequency of the natural vibration mode to occur at the target position. In addition, although the natural resonance frequency of the optical disc medium may fluctuate due to some factor such as the rotational speed thereof, the focused-beam spot can track the target position of the optical disc medium with a higher accuracy, by estimating the natural resonance frequency in the frequency estimator and changing the frequency amplified in the filter, even if the natural resonance frequency has a fluctuation.

In the positioning control unit of the above exemplary embodiment, the frequency estimator may estimate the natural resonance frequency of at least one mode selected from the natural vibration modes of the target member, and the moving member may be driven based the position error signal obtained by amplifying the signal component in the vicinity of the natural resonance frequency estimated by the frequency estimator, to track the target position of the target member. In this way, the target member can track the target position of the target member with a higher accuracy, even if the target member is excited in the natural vibration mode by an external force etc. thereby causing a fluctuation having the frequency of the natural vibration mode to occur at the target position. In addition, although the natural resonance frequency of the target member may fluctuate due to some factor such as the rotational speed thereof, the moving member can track the target position of the target member with a higher accuracy, by estimating the natural resonance frequency in the frequency estimator and changing the frequency amplified in the filter, even if the natural resonance frequency has a fluctuation.

Although exemplary embodiments of the present invention are described heretofore, the positioning control unit and optical disc drive of the present invention are not limited to the configuration of the above exemplary embodiments, and a variety of modifications or alterations made from the above embodiments may fall within the scope of the present invention.

INDUSTRIAL APPLICABILITY

The present invention can be applied to an apparatus for positioning and track-controlling a transducer that records/reproduces a signal on a disc-shaped information medium such as a axial-tracking control unit or radial-tracking control unit for a laser-focused-beam spot in an optical disc drive.

The invention claimed is:

1. A positioning control unit for allowing a moving member that is a positioning object to track a target position of a rotatable disc-shaped target member, comprising:
a position error detector that detects a relative position error between the target position and the moving member, to output a position error signal;
a filter that passes therethrough said position error signal after amplifying a signal component of said position error signal within a vicinity of a natural resonance frequency of at least one mode selected from natural vibration modes of the rotatable disc-shaped target member; and
a drive unit that drives the moving member based on an output of said filter.

2. The positioning control unit according to claim 1, wherein said filter amplifies said component within the vicinity of the resonance frequency of at least one natural vibration mode among secondary-order and higher-order natural vibration modes of the rotatable disc-shaped target member.

3. The positioning control unit according to claim 1, wherein said filter amplifies, separately from one another, a plurality of components of said position error signal within the vicinity of natural resonance frequencies of a plurality of natural vibration modes selected from the natural vibration modes of the rotatable disc-shaped target member.

4. A positioning control unit for allowing a moving member that is a positioning object to track a target position of a rotatable disc-shaped target member, comprising:
a position error detector that detects a relative position error between the target position and the moving member to output a position error signal;
a frequency estimator that estimates a natural resonance frequency of at least one mode selected from natural vibration modes of the rotatable disc-shaped target member;
a filter that passes therethrough said position error signal after amplifying a signal component of said position error signal within a vicinity of said natural resonance frequency output from said frequency estimator; and
a drive unit that drives the moving member based on an output of said filter.

5. The positioning control unit according to claim 4, wherein said frequency estimator estimates the natural resonance frequency of at least one natural vibration mode among secondary-order and higher-order natural vibration modes of the rotatable disc-shaped target member.

6. The positioning control unit according to claim 4, wherein said frequency estimator estimates natural resonance frequencies of a plurality of natural vibration modes selected from natural vibration modes of the rotatable disc-shaped target member, and said amplifier amplifies, separately from one another, components of said position error signal within the vicinity of a plurality of said natural resonance frequencies estimated by said frequency estimator.

7. The positioning control unit according to claim 4, further comprising a rotational-speed-information acquisition device that acquires information of rotational speed of the rotatable disc-shaped target member around a rotational axis thereof, wherein said frequency estimator estimates said natural resonance frequency based on said information of rotational speed.

8. The positioning control unit according to claim 4, further comprising a thickness measurement device that acquires thickness information of said rotatable disc-shaped target member, wherein said frequency estimator estimates said natural resonance frequency of the rotatable disc-shaped target member based on said thickness information.

9. An optical disc drive that irradiates a focused-beam spot onto an optical disc medium for recording/reproducing information thereon, the optical disc drive comprising the positioning control unit of claim 4, wherein:
the optical disc medium corresponds to the rotatable disc-shaped target member, and
the relative position error is between an information recording layer or an information recording track of the optical disc medium and the focused-beam spot.

10. The optical disc drive according to claim 9, further comprising a rotational-speed-information acquisition device that acquires information of rotational speed of the optical disc medium around a rotational axis thereof, and said frequency estimator estimates said natural resonance frequency based on said information of rotational speed.

11. The optical disc drive according to claim 9, further comprising a thickness measurement device that acquires thickness information of the optical disc medium, wherein said frequency estimator estimates said natural resonance frequency of the optical disc medium based on said thickness information.

* * * * *

UNITED STATES PATENT AND TRADEMARK OFFICE
CERTIFICATE OF CORRECTION

PATENT NO. : 8,179,753 B2  Page 1 of 1
APPLICATION NO. : 12/301188
DATED : May 15, 2012
INVENTOR(S) : Kubota It is certified that error appears in the above-identified patent and that said Letters Patent is hereby corrected as shown below:

In the Specifications

Column 6, Line 6: delete "#G" and insert -- FG --

Column 7, Line 67: delete "FIG. 17," and insert -- FIG. 1, --

Column 9, Line 22: delete "(S)" and insert -- (s) --

Column 9, Line 45: delete "$F(z)=Z[F_{2,1)}(s)F_{(3,1)}(s)F_{4,1)}(s)];$" and insert
-- $F(z) = Z[F_{(2,1)}(s)\ F_{(3,1)}(s)\ F_{(4,1)}(s)];$ --

Column 9, Line 47: delete "$\omega_{(a,b)}^2)$" and insert -- $\omega_{(a,b)}^2),$ --

Column 9, Line 50: delete "$\zeta_{(n(2,1)}$" and insert -- $\zeta_{n(2,1)}$ --

Column 9, Line 52: delete "$\zeta_{(n(3,1)}$" and insert -- $\zeta_{n(3,1)}$ --

Column 9, Line 54: delete "$\zeta_{(n(4,1)}$" and insert -- $\zeta_{n(4,1)}$ --

Signed and Sealed this
Eleventh Day of March, 2014

Michelle K. Lee
*Deputy Director of the United States Patent and Trademark Office*